United States Patent
Kong et al.

(10) Patent No.: US 12,508,187 B2
(45) Date of Patent: Dec. 30, 2025

(54) HAPTIC GUIDING SYSTEM

(71) Applicant: AI Guided Limited, Hong Kong (CN)

(72) Inventors: Ka Wai Kong, Hong Kong (CN); Hiu Ling Chan, Hong Kong (CN)

(73) Assignee: AI Guided Limited, Hong Kong (CN)

( * ) Notice: Subject to any disclaimer, the term of this patent is extended or adjusted under 35 U.S.C. 154(b) by 109 days.

(21) Appl. No.: 18/548,357

(22) PCT Filed: Nov. 30, 2022

(86) PCT No.: PCT/CN2022/135367
§ 371 (c)(1),
(2) Date: Aug. 30, 2023

(87) PCT Pub. No.: WO2023/151351
PCT Pub. Date: Aug. 17, 2023

(65) Prior Publication Data
US 2024/0130922 A1 Apr. 25, 2024
US 2024/0225945 A9 Jul. 11, 2024

Related U.S. Application Data

(60) Provisional application No. 63/370,264, filed on Aug. 3, 2022.

(30) Foreign Application Priority Data

Feb. 11, 2022 (HK) .......................... 32022048046.3

(51) Int. Cl.
*A61H 3/06* (2006.01)
*G01C 21/34* (2006.01)
(Continued)

(52) U.S. Cl.
CPC ......... *A61H 3/061* (2013.01); *G01C 21/3446* (2013.01); *G01C 21/3461* (2013.01);
(Continued)

(58) Field of Classification Search
CPC ............... A61H 3/061; G01C 21/3446; G01C 21/3441; G01C 21/3647; G01C 21/3652; C01C 21/3602; G06T 7/13; G06F 3/016
(Continued)

(56) References Cited

U.S. PATENT DOCUMENTS 10,679,424 B2 6/2020 Jovanovic et al.
2013/0218456 A1 8/2013 Zelek et al.
(Continued)

FOREIGN PATENT DOCUMENTS

CN 105748265 A 7/2016
CN 106063245 A 10/2016
(Continued)

OTHER PUBLICATIONS

Examination Notice of Hong Kong Standard Patent (O) Application No. 22022064936.6 issued from the Hong Kong Intellectual Property Department on Oct. 4, 2024.
(Continued)

*Primary Examiner* — Jack K Wang
(74) *Attorney, Agent, or Firm* — S&F/WEHRW

(57) ABSTRACT

An apparatus for assisting the mobility of a user is disclosed. The apparatus includes an electronic device provided in a device body and a haptic unit. The electronic device includes a sensing unit, a machine vision unit, and a path planning unit. The machine vision unit is connected to the sensing unit and is configured to detect one or more obstacles in a vicinity of the user. The path planning unit is capable of developing a movement route for the user to avoid the one or more obstacles. The haptic unit includes a haptic arrangement having a plurality of haptic actuators adapted to provide a tactile stimulation to the torso or limbs of the user. The plurality of haptic actuators actuate based on the move-
(Continued)

ment commands from the path planning unit to signify a travel direction in which there is no obstacle.

28 Claims, 14 Drawing Sheets

(51) Int. Cl.
  *G01C 21/36* (2006.01)
  *G06F 3/01* (2006.01)
  *G06T 7/13* (2017.01)
  *G09B 21/00* (2006.01)

(52) U.S. Cl.
  CPC ..... *G01C 21/3602* (2013.01); *G01C 21/3647* (2013.01); *G01C 21/3652* (2013.01); *G06F 3/016* (2013.01); *G06T 7/13* (2017.01); *G09B 21/003* (2013.01); *A61H 2003/063* (2013.01); *A61H 2201/5092* (2013.01)

(58) Field of Classification Search
  USPC ....................................................... 340/407.1
  See application file for complete search history.

(56) References Cited

U.S. PATENT DOCUMENTS

| | | | |
|---|---|---|---|
| 2016/0284235 A1 | 9/2016 | Zhang | |
| 2020/0064141 A1* | 2/2020 | Bell | G09B 21/006 |
| 2022/0036566 A1* | 2/2022 | Rama | G06F 18/22 |
| 2022/0062053 A1* | 3/2022 | Briand | G06F 3/013 |
| 2022/0282985 A1* | 9/2022 | Amariei | G09B 21/007 |
| 2022/0323285 A1* | 10/2022 | Littwitz | G09B 21/001 |
| 2022/0323286 A1* | 10/2022 | Cansizoglu | G09B 21/003 |
| 2023/0050825 A1* | 2/2023 | Plikynas | G06V 20/20 |

FOREIGN PATENT DOCUMENTS

| | | |
|---|---|---|
| CN | 109276418 A | 1/2019 |
| CN | 110857857 A | 3/2020 |
| CN | 116829906 A | 9/2023 |

OTHER PUBLICATIONS

Extended European Search Report; PCT Application No. Application PCT/CN2022135367 Issued from the European Patent Office on Apr. 10, 2025.

* cited by examiner

HAPTIC GUIDING SYSTEM

CROSS-REFERENCE TO RELATED APPLICATIONS

This application claims the benefit of the Hong Kong Short-term Patent Application No. 32022048046.3, filed on 11 Feb. 2022, and the U.S. Provisional Patent Application No. 63/370,264, filed on 3 Aug. 2022, which are both incorporated by reference herein in its entirety.

FIELD OF THE INVENTION

The present invention generally relates to an artificial intelligence (A.I.) haptic guiding system, and particularly relates to a guiding system for guiding a visually impaired person, an elderly, or other people with disabilities.

BACKGROUND OF THE INVENTION

Visually impaired persons are individuals who suffer from vision loss (partial or complete). These individuals often have difficulties traveling or moving independently in an environment and they often require assistance to move in the environment.

The elderly suffering from dementia or other cognitive impairments may not be able to perform tasks independently. Usually, the elderly needs assistance from a caretaker in order to complete the basic daily tasks. However, the labour cost for the caretaker is so high that the elderly may avoid unnecessary traveling.

Conventional assistive means for guiding visually impaired persons and elderlies include guide dogs and white canes. These assistive means can enhance mobility but they have their limitations. For example, a white cane or a walking stick has a relatively low detection resolution (one "click" per point of contact) and requires an extended period of training. On the other hand, a guide dog requires a lot of resources to manage and maintain, and the performance is relatively unpredictable compared to inanimate tools. Both of them cannot detect head-level obstacles effectively.

There are also a few advanced assistive devices introduced with the aim of providing information both more quantitatively and qualitatively than the conventional assistive means. For example, vibratory devices for assisting navigation using global positioning system (GPS) and ultrasonic sensors, smart glasses with built-in cameras, earphones (or speaker), and Wi-Fi connections. However, both devices led to different drawbacks. If there is no reception of GPS and Wi-Fi connections, the device may not operate properly. Based on the opinions of the visually impaired person, they found it annoying to have audio feedback from the smart glasses since the users heavily rely on their ears to perceive their surroundings. The audio feedback may affect daily practice and may cause headaches and confusion.

Accordingly, there is a need to provide an alternative or additional assistive means that helps the visually impaired person and the elderly. Furthermore, other desirable features and characteristics will become apparent from the subsequent detailed description and the appended claims, taken in conjunction with the accompanying drawings and this background of the disclosure.

SUMMARY OF THE INVENTION

Provided herein is an apparatus for assisting the mobility of a visually impaired person or the elderlies. It is an objective of the present disclosure to provide a haptic guiding system that can be used by the person in need independently.

In accordance with the first aspect of the present disclosure, an apparatus for assisting the mobility of a user is provided. The apparatus includes an electronic device provided in a device body and a haptic unit. The electronic device includes a sensing unit, a machine vision unit, and a path planning unit. The device body is arranged to be worn by or secured to the user. the machine vision unit is connected to the sensing unit and is configured to detect one or more obstacles in a vicinity of the user. The path planning unit is capable of developing a movement route for the user to avoid the one or more obstacles. The haptic unit is capable of receiving movement commands from the path planning unit. In certain embodiments, the haptic unit includes a haptic arrangement having a plurality of haptic actuators adapted to provide a tactile stimulation to torso or limbs of the user, wherein the plurality of haptic actuators actuate based on the movement commands. The tactile stimulation is applied to one or more target sites of the user's body, and the plurality of haptic actuators actuate to signify a travel direction in which there is no obstacle.

In accordance with a further embodiment of the present disclosure, the sensing unit continuously and regularly captures real-time images of an environment. The machine vision unit is configured to determine a walkable area on each of the real-time images using an edge detection algorithm and a semantic segmentation algorithm, and identify the one or more obstacles using an object detection model. The path planning unit is capable of developing the movement route by avoiding the one or more obstacles and transmit to the haptic unit the movement commands based on the movement route.

In accordance with a further embodiment of the present disclosure, the apparatus further includes one or more wired or wireless communication links for transmitting the movement commands from the path planning unit to the haptic unit.

In accordance with a further embodiment of the present disclosure, the electronic device further includes a processor and a computer-readable medium for storing executable instructions. The executable instructions, if executed, cause the processor to perform one or more functions of the machine vision unit and the path planning unit. The executable instructions enable at least one AI-based algorithm that automates operations to detect the one or more obstacles and develop the movement route; and at least one non-AI-based algorithm that performs data processing such as filtering, segmenting, thresholding, averaging, smoothing, padding, transforming, and scaling.

In accordance with a further embodiment of the present disclosure, the at least one AI-based algorithm is configured to detect or recognize static and moving obstacles for ground to head levels, and create a 3D map of the static and moving obstacles; and perform deep learning calculations for determining one or more possible movement routes in the vicinity of the user that the user can move through without being affected by the obstacles.

In accordance with the second aspect of the present disclosure, a method for assisting a user in navigation is provided. The method includes (1) receiving a first image and a second image captured by one or more cameras; (2) determining a walkable area using an edge detection algorithm and an AI semantic segmentation algorithm on the second image; (3) identifying one or more obstacles in a vicinity of the user using an object detection model on the first image; (4) developing a movement route for the user by avoiding the one or more obstacles; and (5) transmitting movement commands to a haptic unit for signifying to the user a travel direction.

In accordance with a further embodiment of the present disclosure, the step of identifying the one or more obstacles further includes (1) detecting objects positioned at ground to head levels of the user; (2) classifying the objects as target destination, static obstacles, or moving obstacles; and (3) creating a 3D map of the objects detected.

In accordance with a further embodiment of the present disclosure, the step of developing the movement route includes constructing boundary lines within the walkable area leading to the target destination; and dynamically determining a distance between the user and each of the boundary lines for performing realignment to avoid a collision.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
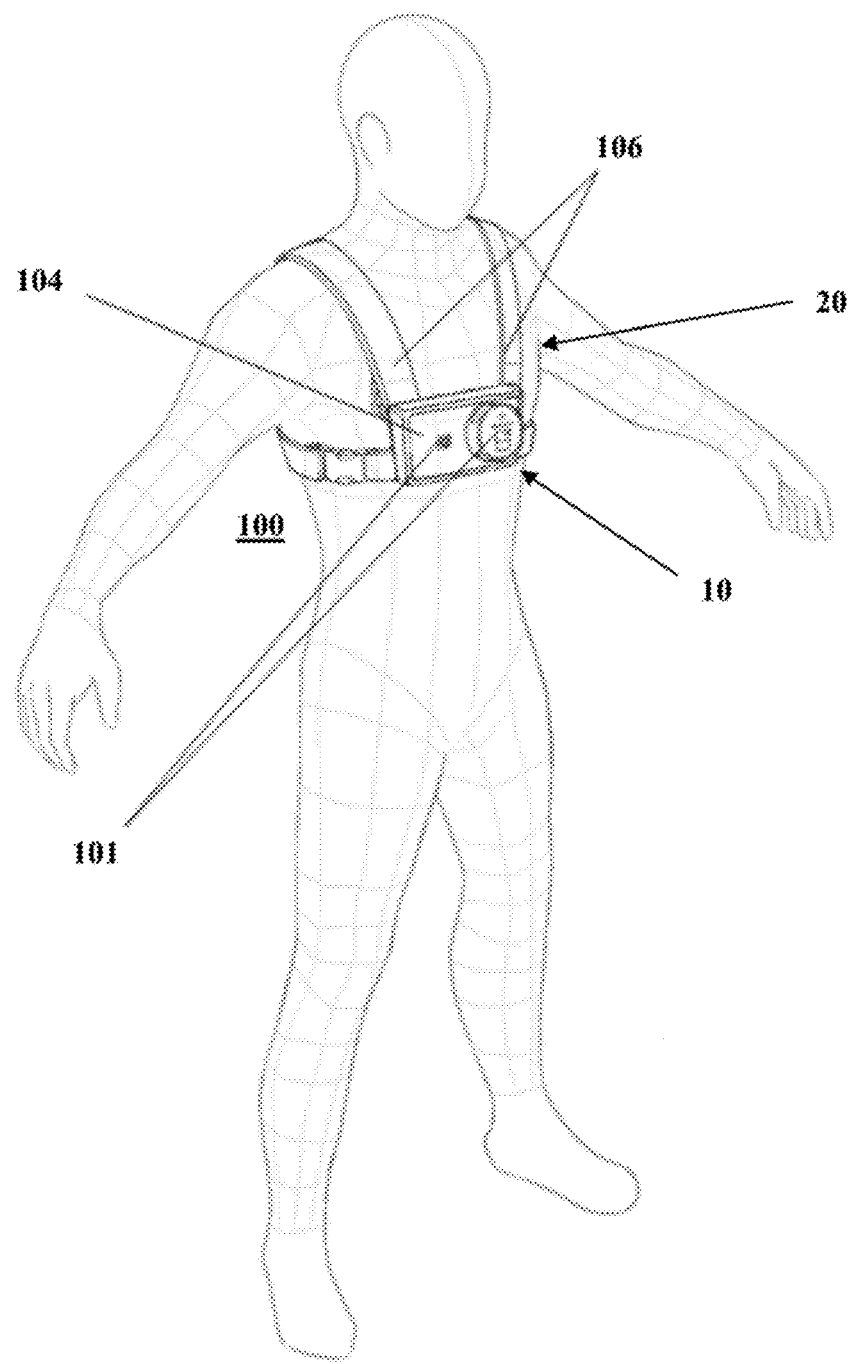
FIG. 1 is a schematic diagram illustrating the use of the haptic guiding system for a visually impaired person or an elderly in accordance with certain embodiments of the present disclosure.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," and "including" or any other variation thereof, are to be construed as open-ended terms (i.e., meaning "including, but not limited to,") unless otherwise noted. The use of any and all examples, or exemplary language (e.g., "such as") provided herein, is intended merely to illuminate the invention better and does not pose a limitation on the scope of the invention unless otherwise claimed. No language in the specification should be construed as indicating any non-claimed element as essential to the practice of the invention. Further, unless expressly stated to the contrary, "or" refers to an inclusive "or" and not to an exclusive "or". For example, a condition A or B is satisfied by any one of the following: A is true and B is false, A is false and B is true, and both A and B are true. Terms of approximation, such as "about", "generally", "approximately", and "substantially" include values within ten percent greater or less than the stated value.

Unless otherwise defined, all terms (including technical and scientific terms) used in the embodiments of the present invention have the same meaning as commonly understood by an ordinary skilled person in the art to which the present invention belongs.

The term "visually-impaired person", as used herein, refers to a person who is suffering from a partial or complete vision loss problem, which includes and is not limited to a blind person. The haptic guiding system of the disclosure may be used alone or in combination with other assistive technologies, such as guide dog or white cane.

The body of a person, as described throughout the specification and the claims, includes anterior and posterior portions as defined by the coronal/frontal plane, and left and right portions as defined by the median plane.

Figure 2:
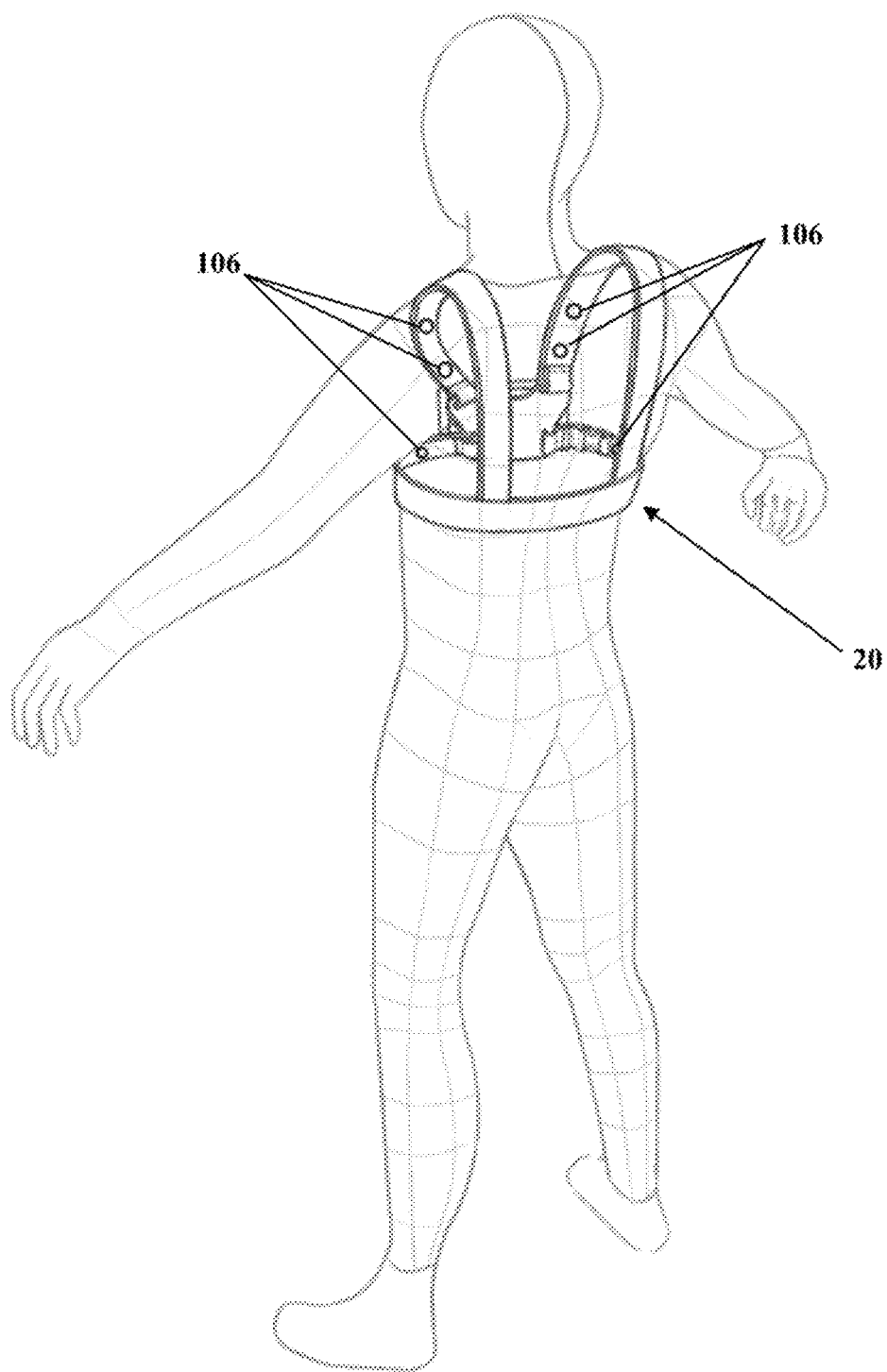
FIG. 2 is a rear perspective view of FIG. 1.

FIG. 1 and FIG. 2 illustrate an exemplary haptic guiding system 100 for a user in need of a guiding assistant, such as a visually impaired person, an elderly, or other people with an inability to navigate, in accordance with certain embodiments of the present disclosure. The haptic guiding system 100 may be an apparatus that can be used to assist the mobility of the user. Advantageously, the haptic guiding system 100 is a hand-free apparatus allowing the user to avoid obstacles without the need to hold anything. In the illustrated embodiment, the haptic guiding system 100 can comprise an electronic device 10, and a haptic unit 20. The electronic device 10 can be provided in a device body, wherein the device body is arranged to be worn by or secured to the user. The haptic unit 20 may have various forms and designs. In the illustrated embodiment, the haptic unit 20 includes one or more haptic straps arranged to adjustably surround the user to secure the device body on the user, thereby when the straps are secured, the electronic device 10 can be secured to the chest, on the hip, on the neck, or across the front torso of the user. The haptic unit 20 includes a haptic arrangement having a plurality of haptic actuators 106 adapted to provide a tactile stimulation to the torso or limbs of the user. Therefore, the tactile stimulation is applied to one or more target sites of the user's body. For example, the tactile stimulation is applied to the left side and right side of the torso for indicating a left turn or a right turn respectively. With the tactile stimulation, the user can understand the suggested movement route for avoiding obstacles in the vicinity of the user. Therefore, the plurality of haptic actuators 106 actuate to signify a travel direction in which there is no obstacle.

As it is given that the device body is arranged to be worn by or secured to the user. In one embodiment, the device body is secured proximate to the chest of the user. The electronic device 10 is configured to continuously and regularly capture real-time images of an environment to obtain information of the obstacles in the environment, and to develop a movement route for the user to avoid the one or more obstacles. The electronic device 10 comprises but is not limited to, a sensing unit 101 and a processor 104. In certain embodiments, the processor 104 comprises an A.I. computing board. The sensing unit 101, the processor 104, and the plurality of haptic actuators 106 are in communication through one or more wired or wireless communication links. In the illustrated embodiment, the sensing unit 101 is arranged to be placed on an anterior portion and at the chest level of the user's body. It is apparent that the sensing unit 101 may also be placed at the hip level or the neck level without departing from the scope and spirit of the present disclosure. In other words, the sensing unit 101 is facing the same direction as the user. The electronic device 10 can be provided in a standalone device or incorporated into another smart device (such as a mobile phone, a tablet computer, a pad-like computer, a smart watch, or other wearable apparatus). For the case of a standalone device, the device body may include a battery receptacle for receiving a power source for powering the haptic guiding system 100. The battery receptacle may be arranged to receive batteries, such as but not limited to one or more replaceable lithium batteries.

In certain embodiments, the haptic unit 20 may include adjustable straps to retain the device body in position. The adjustable straps may be made of polypropylene, leather, fiber, silicone, natural rubber, nylon webbing, or other stretchable or non-stretchable materials. On the posterior side of the adjustable straps, a plurality of haptic actuators 106 are arranged to deliver a sensory signal to the user. In the illustrated embodiments, the plurality of haptic actuators 106 are positioned on the underside of the adjustable straps to form a haptic arrangement adapted to provide a tactile stimulation to the torso or limbs of the user, such as vibration stimulation, push actuation, pull actuation, a temperature stimulation, a compression caused by a change in tension of a haptic strap. The plurality of haptic actuators 106 may or may not be in skin contact with the user. Although the illustrated embodiment shows a haptic arrangement provided on haptic straps, it is apparent that the haptic arrangement can also be provided in a belt or a plurality of rings arranged around the user's arms (for example, forearm or upper arm), thereby the sensory signal is provided to the hip or the arms of the user. The processor 104 may also be arranged in the belt or the plurality of rings, distributed across both, or arranged in the cloud or a remote device (e.g., server).

Preferably, it is not desirable to arrange the plurality of haptic actuators 106 or the sensing unit 101 on the head of the user (such as glasses or headband). The problem is that the user is free to move the head to different directions, and may rotate the head about the sagittal plane and/or the coronal plane. It would cause complexity to the obstacle detection if the sensing unit 101 is placed on the head, which may not align with the body or the legs of the user. Furthermore, the plurality of haptic actuators 106 provide stimulation to the user with reference to the movement direction of the user, not the direction of the head of the user. The user may be confused by the tactile stimulation when the head is not forward facing. Therefore, the present disclosure provides a tactile stimulation to the torso or limbs of the user.

Figure 3:
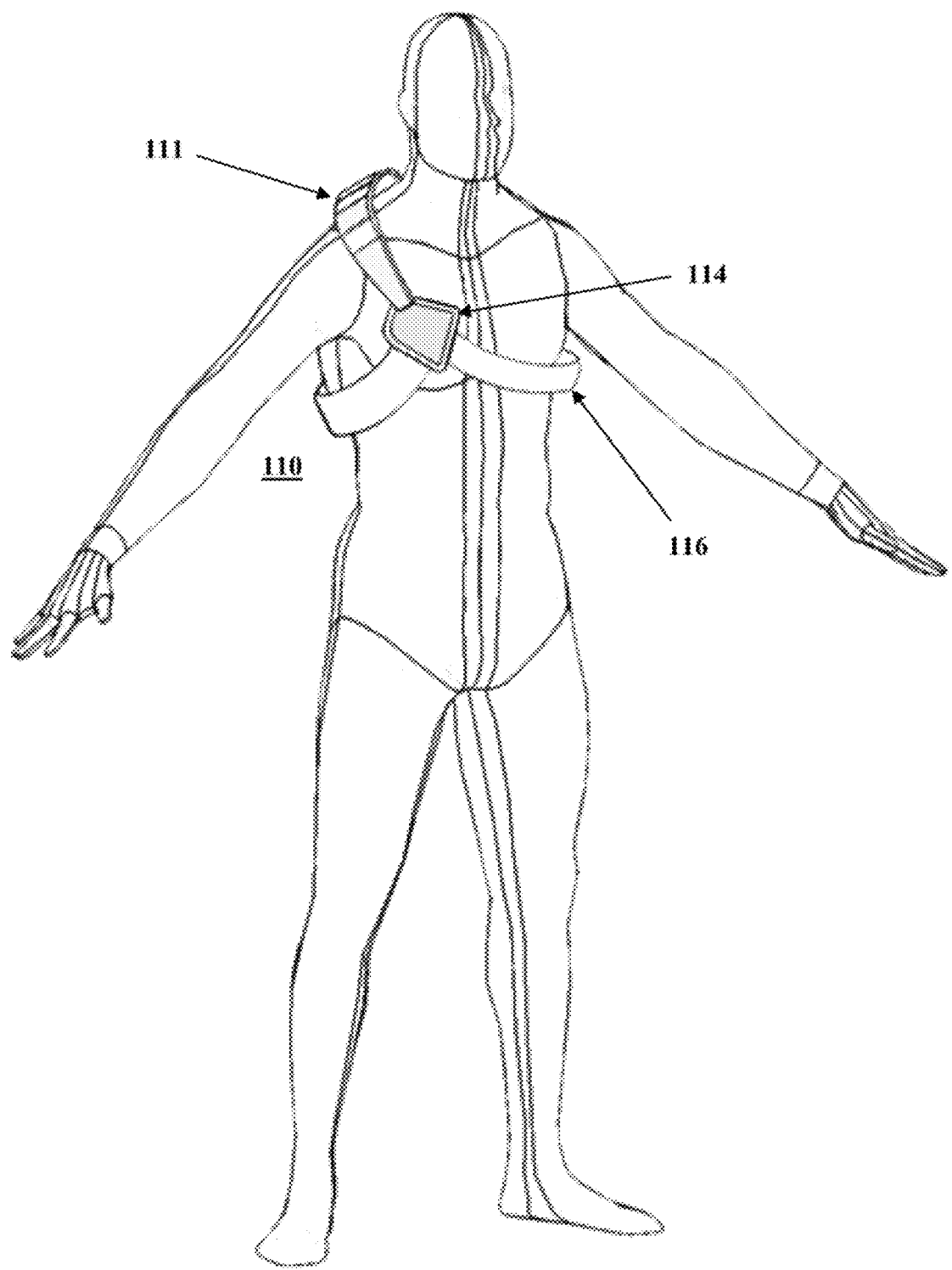
FIG. 3 is a first configuration of the haptic guiding system.

FIG. 3 shows a first configuration 110 of the haptic guiding system. The electronic device 114 is placed around the chest of the user, which is secured using a three-point restraint harness, comprising a shoulder portion, and two waist portions. A sensing unit 111 is provided on the shoulder portion, and a haptic unit 116 is provided on the two waist portions. The haptic stimulation is applied to at least a first target site on the left side of the torso of the user's body, and a second target site on the right side of the torso of the user's body.

Figure 4:
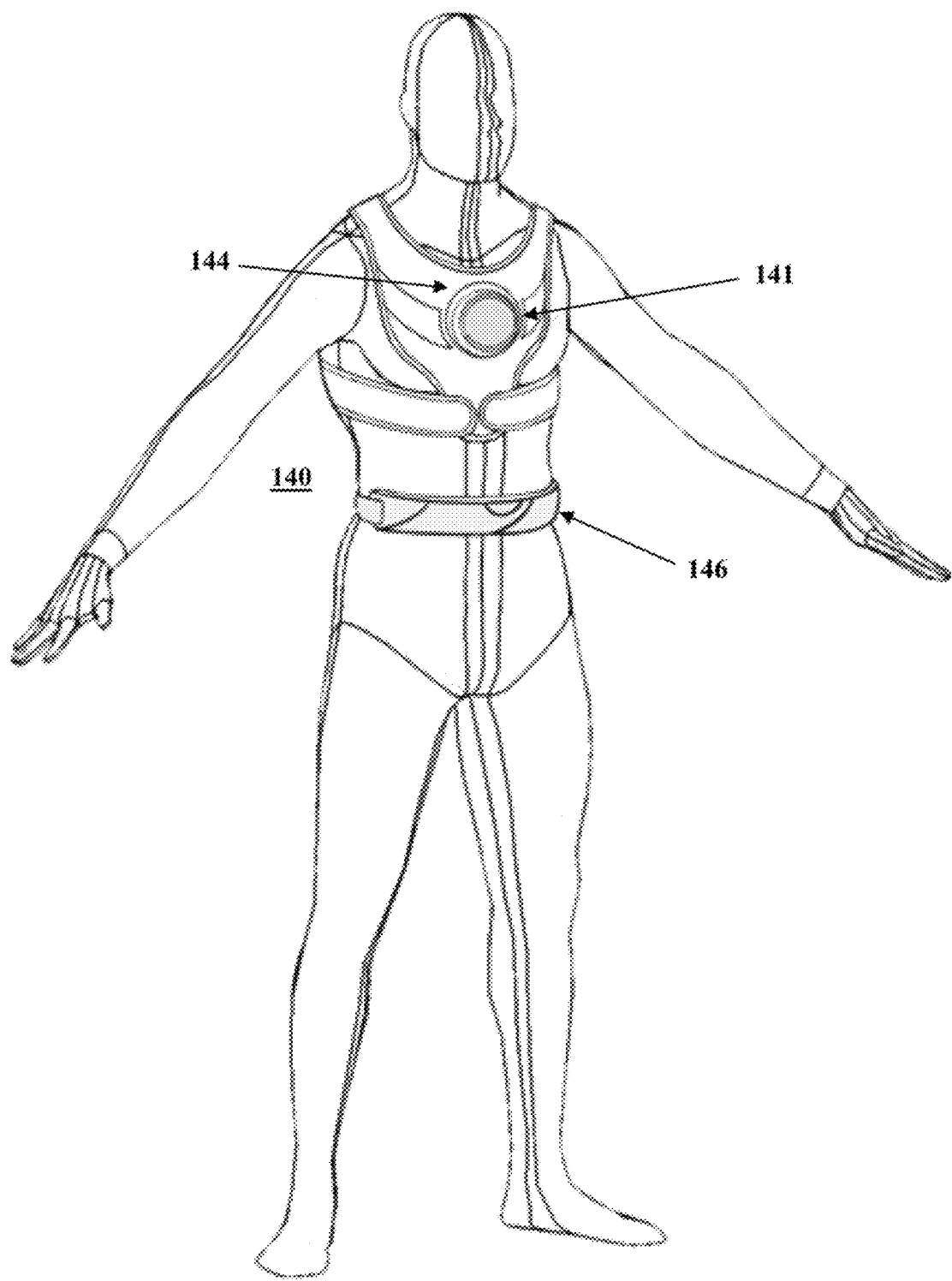
FIG. 4 is a second configuration of the haptic guiding system.

FIG. 4 shows a second configuration 140 of the haptic guiding system. The electronic device 144 is placed around the chest of the user, which is secured using a four-point restraint harness. A sensing unit 141 is provided on the electronic device 144, and a haptic unit 146 is provided on a belt. The haptic stimulation is applied to at least a first target site on the left side of the torso of the user's body, and a second target site on the right side of the torso of the user's body.

Figure 5:
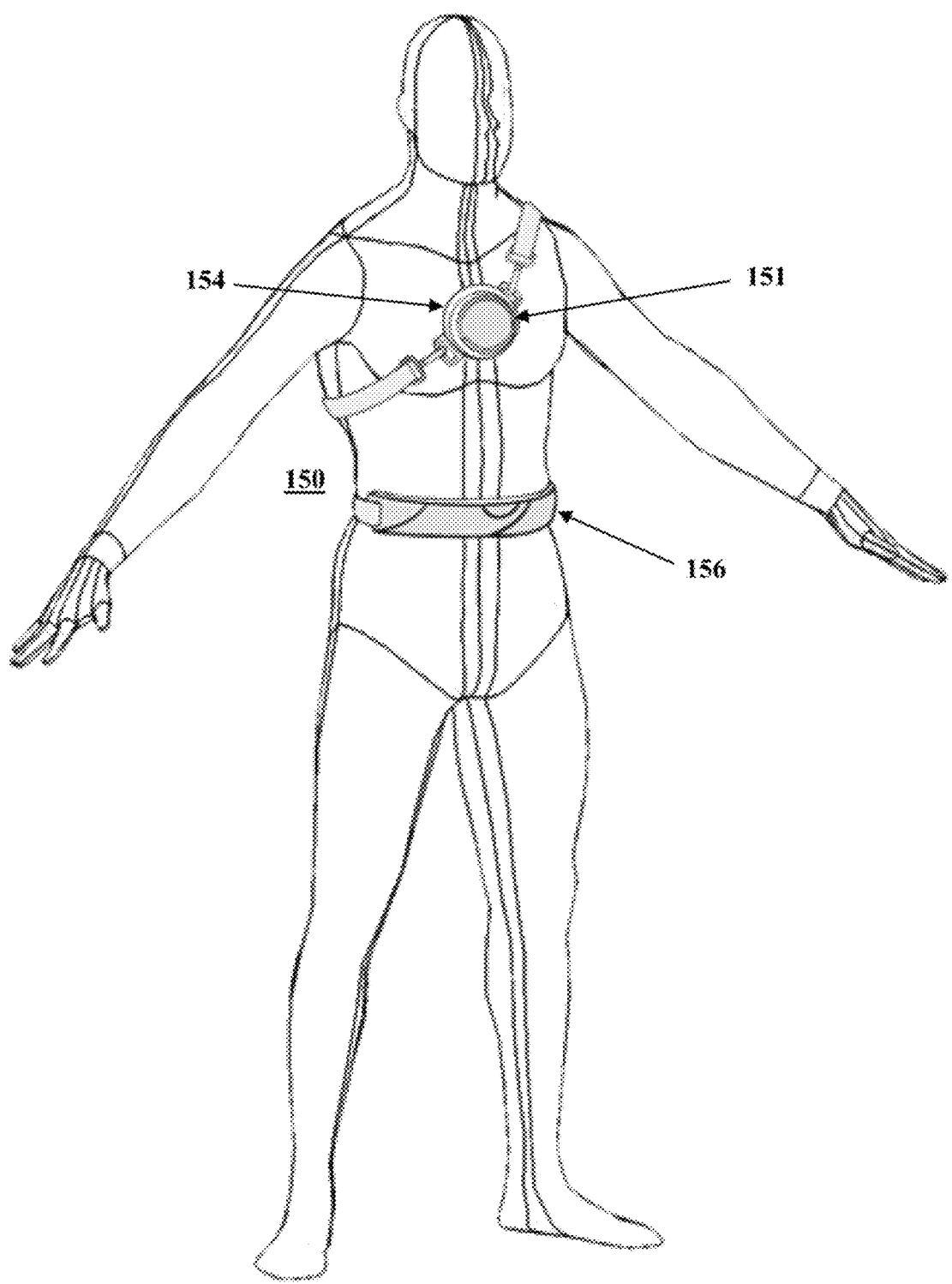
FIG. 5 is a third configuration of the haptic guiding system.

FIG. 5 shows a third configuration 150 of the haptic guiding system. The electronic device 154 is placed around the chest of the user, which is secured using a two-point restraint harness. A sensing unit 151 is provided on the electronic device 154, and a haptic unit 156 is provided on a belt similar to the fourth configuration 140.

Figure 6:
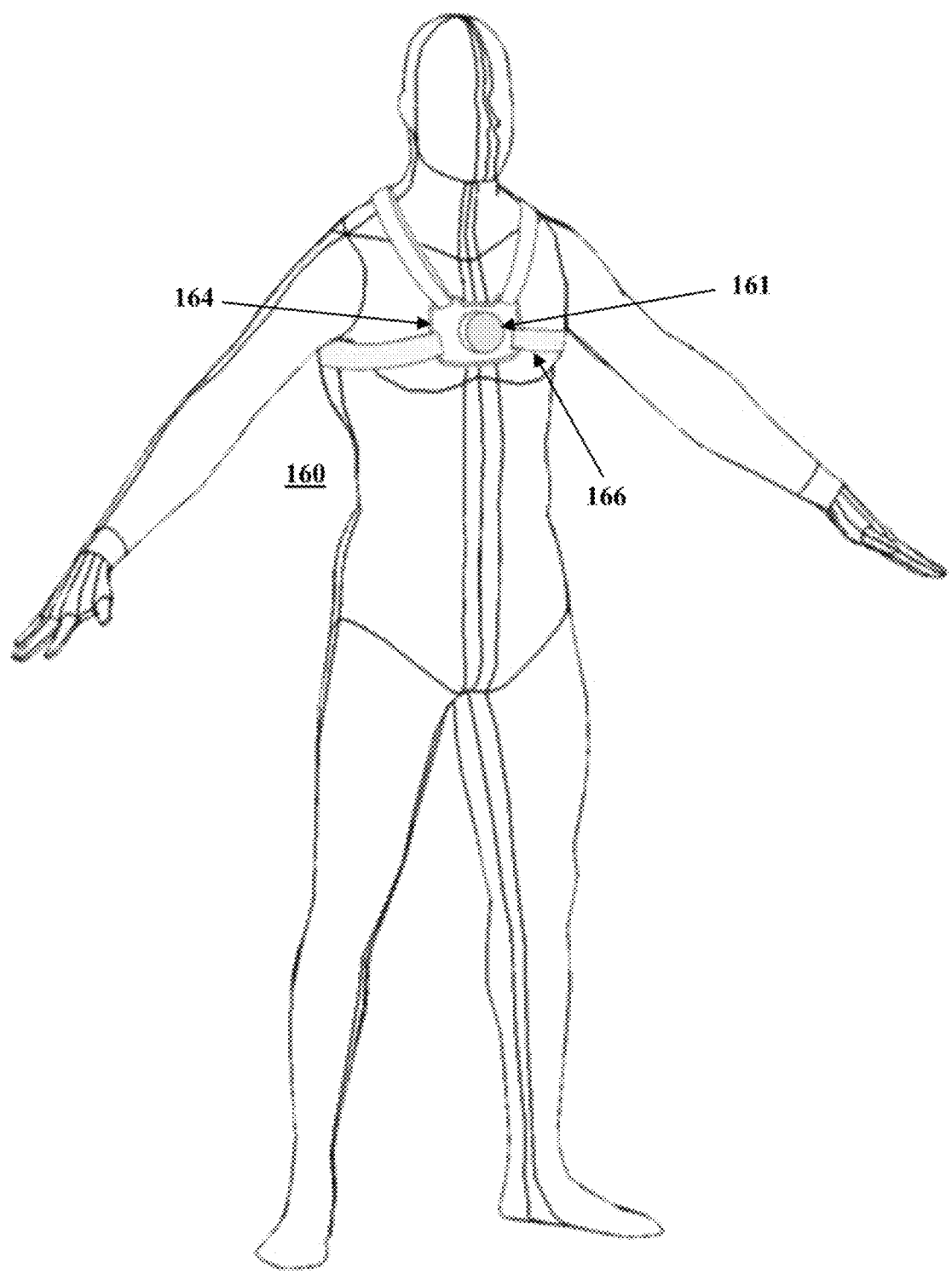
FIG. 6 is a fourth configuration of the haptic guiding system.

FIG. 6 shows a fourth configuration 160 of the haptic guiding system. The electronic device 164 is placed around the chest of the user, which is secured using a four-point restraint harness comprising two shoulder portions, and two waist portions. A sensing unit 161 is provided on the electronic device 164, and a haptic unit 166 is provided on the two waist portions similar to that in the first configuration 110.

Figure 7:
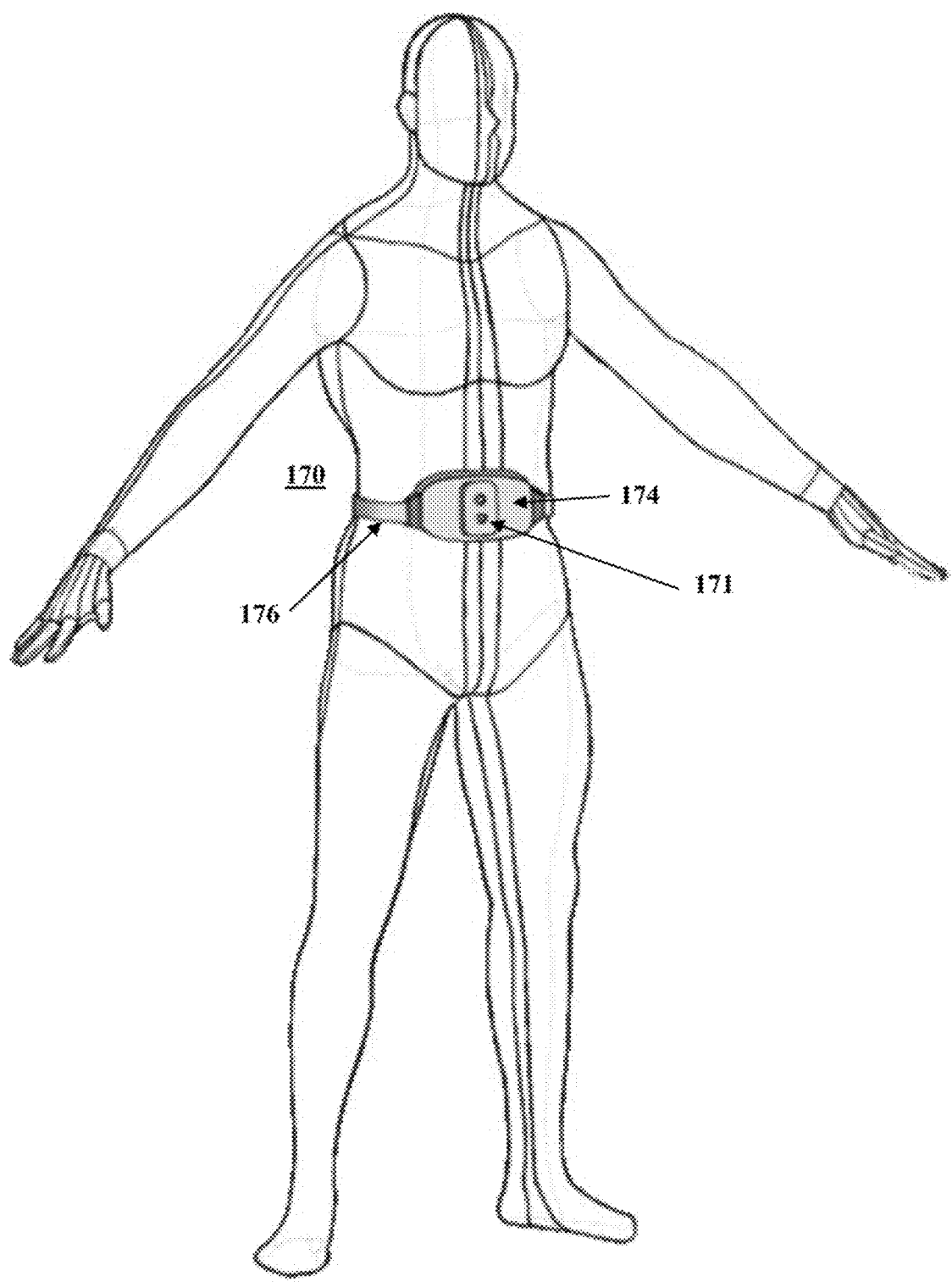
FIG. 7 is a fifth configuration of the haptic guiding system.

FIG. 7 shows a fifth configuration 170 of the haptic guiding system. The haptic unit 176, electronic device 174, and the sensing unit 171 are all placed on a belt or a brace. The actuators of the haptic unit 176 are preferably positioned on the underside of the belt or the brace, while the electronic device 174 and the sensing unit 171 are placed centrally on the hypogastric region.

Figure 8:
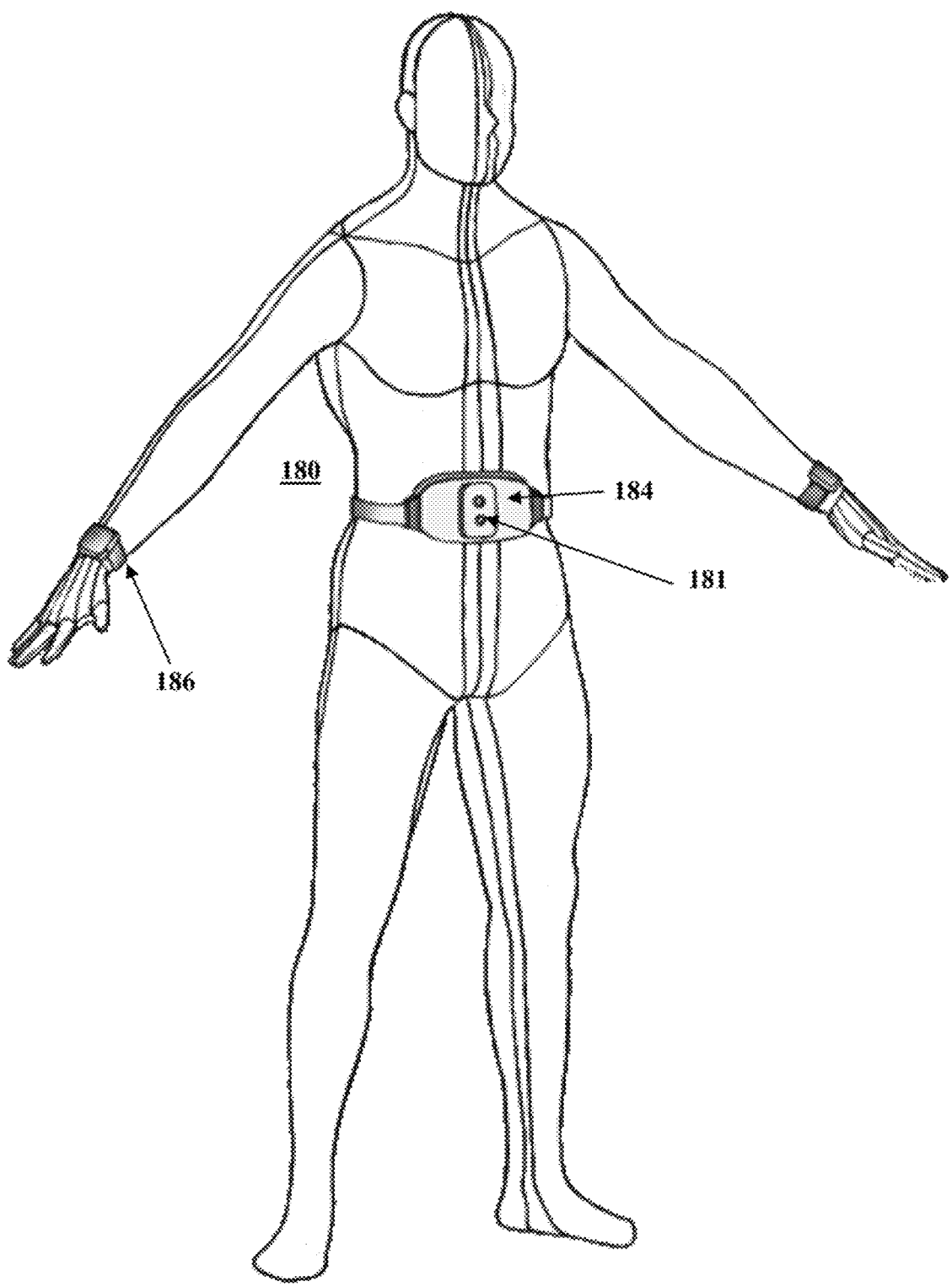
FIG. 8 is a sixth configuration of the haptic guiding system.

FIG. 8 shows an sixth configuration 180 of the haptic guiding system. The electronic device 184 and the sensing unit 181 are all placed on a belt or a brace, such that they are placed centrally on the hypogastric region. The haptic unit 186 are installed on the underside of two wrist bands, which are wirelessly connected to the electronic device 184. The haptic stimulation is applied to at least a first target site on the left arm and a second target site on the right arm.

Figure 9:
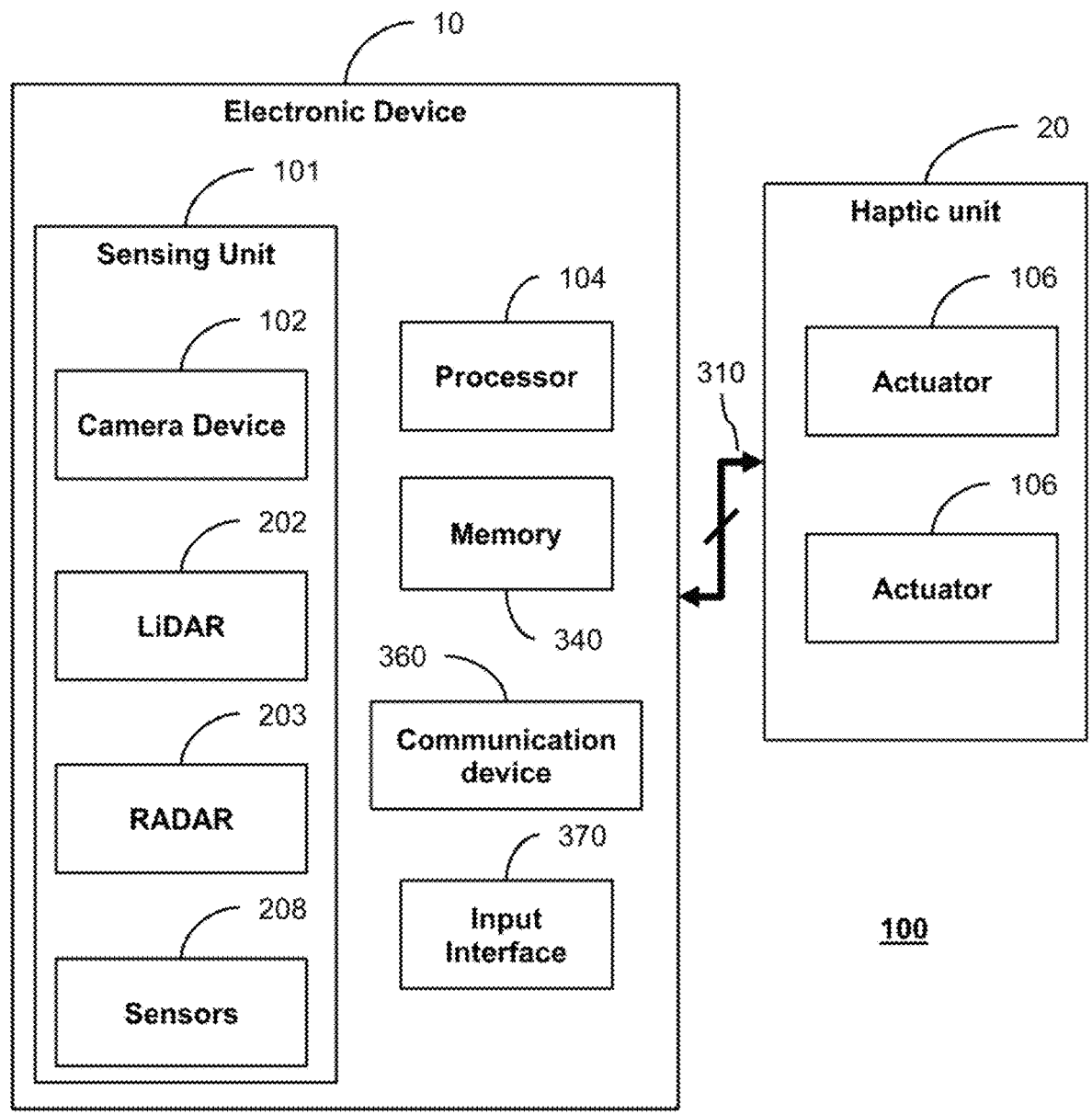
FIG. 9 is a block diagram of the haptic guiding system in accordance with one embodiment of the present disclosure.
Figure 10:
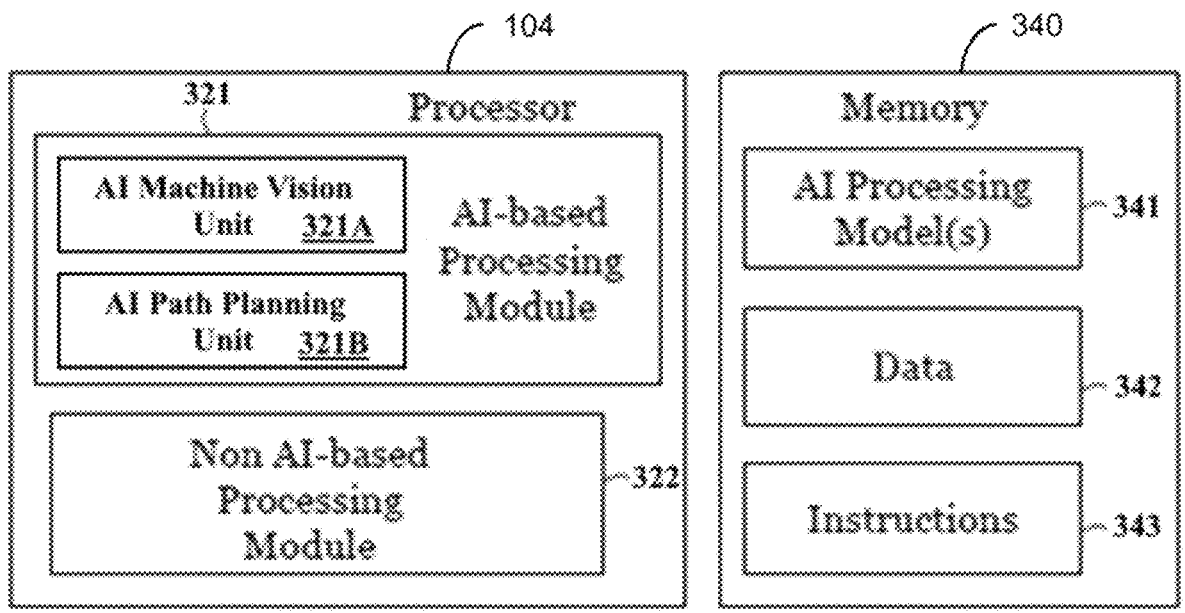
FIG. 10 is a block diagram of a processor and the memory in the haptic guiding system in accordance with certain embodiments of the present disclosure.

FIG. 9 shows the block diagram of the haptic guiding system 100 of FIG. 1. The haptic guiding system 100 includes an electronic device 10 and a haptic unit 20. The electronic device 10 further includes a sensing unit 101, a processor 104, and a memory 340. FIG. 10 shows the detailed structure of the processor 104 and the memory 340 in one embodiment. The haptic unit 20 includes a haptic arrangement having a plurality of haptic actuators 106. In certain embodiments, the sensing unit 101 comprises one or more sensing devices selected from a group consisting of one or more camera devices 102, a light detection and ranging (LiDAR) device 202, a radio detection and ranging (RADAR) 203, and one or more sensors 208. The sensing unit 101 continuously and regularly captures real-time images of an environment for the processor 104 to develop a movement route.

The electronic device 10 may be equipped with one or more camera devices 102 for capturing real-time images and video footages of the environment in the vicinity of the user. The video footages can also be sampled at a predetermined frequency to obtain image frames as real-time images. Other geographic information system (GIS) data of the environment and the surrounding are collected by the sensing unit 101, which may be added to the real-time images to form complete information about the environment. The obtained information can be processed by the processor 104 for detecting one or more obstacles and generating a 3D map of the obstacles in the environment. In one example, the one or more camera devices 102 include a camera and/or one or more RGB sensors but are not limited to night vision cameras. In another example, the sensing unit 101 is also equipped with a LiDAR device 202, a RADAR device 203, and one or more sensors 208. The sensing unit 101 is configured to detect the low-height (for example, 2 meters in height) environment structures, objects, or obstacles, which include those objects not placed on the ground but may obstruct the user from moving forward. In one example, the objects in front of the user that may obstruct the movement of the user are identified. In one example, the wall edges, stairs (upward and downward), and other static objects are captured by the sensing unit 101 for the processor 104 to process. In one example, the one or more camera devices 102 include an infrared light-emitting diodes arranged to illuminate the surroundings in order to generate a grayscale image when the environment is dark or low in light. In one example, the one or more camera devices 102 is a fish-eye camera, a monocular camera, a multi-view camera, a stereo camera, or the like that image the environment.

The sensing unit 101 comprises one or more cameras. In one embodiment, the sensing unit 101 has one camera to capture a first image and a second image. In another preferred embodiment, the sensing unit 101 includes a first camera and a second camera, wherein the first camera is an upper camera for object detection, and the second camera is a lower camera for path planning and semantic segmentation. In one example, objects such as human persons, elevator doors, automatic sliding doors, bus stop signs, vehicles, chairs, tables, etc. are detectable by the processor 104 using the real-time images captured by the first camera. The object detection model as provided in the present disclosure aids the user in finding meaningful destinations and helps the processor 104 to analyze the real-time images from the second camera for better recognizing the edge and planning the movement route.

The semantic segmentation is executed to find a walkable path within the viewing angle of the second camera. From the walkable area, a target destination is determined such that the haptic unit 20 would guide the user to move towards using the path planning unit 321B. The processor 104 is configured to construct one or more boundary lines within the walkable area leading to the target destination, and dynamically determine a distance between the user and each of the boundary line for performing realignment to avoid a collision. In certain embodiments, the path planning unit 321B is based on a neural network model. In one example, when the user moves too close to the boundary line, the target destination is slightly adjusted and the processor 104 would transmit movement commands to the haptic unit 20 to guide the user away from the boundary line to avoid a collision. The boundary lines are determined with the aid of the edge detection algorithm. In certain embodiments, the sensing unit 101 further includes LiDAR devices 202 for detecting objects or persons suddenly appearing ahead of the user that may cause an immediate collision.

The one or more sensors 208 may include one or more of: a 3-axis accelerometer, a 3-axis gyroscope, and location sensor (GPS sensor). In certain embodiments, the one or more sensors 208 may also include extra sensors selected from one or more of: a pressure sensor, sound sensor, temperature sensor, image sensor, motion sensor, light sensor, proximity sensor, etc. The one or more sensors 208 are arranged to sense one or more properties of the environment, and the processor 104 is arranged to process and further use the one or more sensed properties to determine the movement route for the user and hence the action that needs to be taken by the user to execute the movement route. In one example, if the sensor is a location sensor and the processor 104 determines that the location detected by the location sensor may potentially be hazardous to the user, the processor 104 may take that into account when devising the movement route so that the plan is to move the user away from that location. In one example, if the sensor is a temperature sensor and the processor 104 determines that the temperature detected by the temperature sensor is too hot or cold for the user, the processor 104 may take that into account when devising the movement route so that the plan is to move the user away from that location.

In one embodiment, the one or more sensors 208 comprise an acoustic sensor arranged to detect acoustic information (e.g., acoustic signals, such as infrasound, audible sound, ultrasound) in the environment and the processor 104 is arranged to process and further use the acoustic information (along with the obstacle related information obtained from the LiDAR device 202) to determine the movement route for the user and hence the action that needs to be taken by the user to execute the movement route.

In one embodiment, the one or more sensors 108 may include an audible sound sensor, e.g., a microphone, arranged to detect sound present in the environment. In this embodiment, the processor 104 is further arranged to process the detected sound (including filtering, amplification, etc.); determine one or more properties (frequency, amplitude, wavelength, time period, and/or velocity) of the detected sound; and based on the one or more properties, and determine the presence of potential danger (e.g., the occurrence of a car crash, gun shooting, etc.) in the environment. The processor 104 then based on this and the processing with the LiDAR data to devise the movement route so that the movement route facilitates the user in avoiding both obstacles and potential danger in the environment. The processor 104 can determine the movement route based solely on the camera data from the camera device 102, the LiDAR data obtained from the LiDAR device 202, or the data obtained from the sound sensor. The minimum allowed distance between the detection obstacle and the user may vary case by case depending on the conditions determined by the one or more sensors 208.

The processor 104 is arranged to process the information obtained by the sensing unit 101, determine a movement route for the user to avoid the one or more obstacles, and transmit to the haptic unit 20 the movement commands based on the movement route. The movement route is arranged to help the user avoid obstacles in the environment while traveling in the environment. In certain embodiments, the user's physical positions may also be used for determining the movement commands. The movement route includes information about whether and optionally how the user should move in the environment to avoid the one or more obstacles. The movement route may include a movement path, a movement direction, and/or a movement speed (e.g., to bypass an obstacle, to walk at a reduced speed, to stop from moving). In one example, the processor 104 is arranged to process the real-time images to determine the presence of an obstacle or a target destination in the environment, determine whether the obstacle is static or moving, classify a type of the obstacle, and develop a movement route to the target destination for the user. In one example, if it is determined that an obstacle (static or moving) is present, then the movement route would be adjusted to avoid it while traveling in the environment. In one example, if it is determined that the obstacle is moving the movement route may instruct the user to wait for the moving obstacle to move sufficiently away from the user as a way to avoid the moving obstacle. The type of obstacle may affect how close the user can get to the obstacle. For example, an obstacle identified as potentially more dangerous could be avoided to a greater extent (i.e., the user being further away from it) than an obstacle identified as potentially less dangerous. In one example, the processor 104 is arranged to process the camera data from the camera device 102 using one or more AI-based methods to determine the movement route, which assists the user to travel in the environment without being hurt or injured by obstacles. The processor 104 may determine the movement route only using the data obtained from the camera device 102.

The electronic device 10 may also include a communication device 360 and an input interface 370. The communication device 360 is configured to encode the movement commands or make arrangements to allow the movement commands for transmitting to the haptic unit 20. The communication may be wired or wireless communications. The input interface 370 may allow the user to control and/or configure the apparatus.

The plurality of haptic actuators 106 of the haptic arrangement is adapted to provide a sensory signal to the user. The movement commands corresponding to and indicating the action that needs to be taken by the user to execute the movement route are transmitted from the processor 104 to the haptic unit 20 via one or more wired or wireless communication links MO. The plurality of haptic actuators 106 may selectively apply different tactile stimulation to one or more target sites of the user's body for indicating different actions that need to be taken by the user to execute the movement route as determined by the processor 104. In one example, the plurality of haptic actuators 106 include at least one actuator proximate to the upper left portion of the user's body, at least one actuator proximate to the upper right portion of the user's body, at least one actuator proximate to the lower left portion of the user's body, at least one actuator proximate to the lower right portion of the user's body. By arranging at least one actuator at these four quadrants of the user's body, the signal provided to the user can be more intuitively interpreted by the user (e.g., a push on the left indicates a move to the right). Each of the plurality of haptic actuators 106 comprises a motorized finger, an eccentric rotating mass, a linear resonant actuator, or any other actuators that exert a force on the skin of the user. The processor 104 may determine an actuation pattern of the plurality of haptic actuators 106 that corresponds to the action that needs to be taken by the user, and the plurality of haptic actuators 106 are actuated with a plurality of actuation patterns each corresponding to a respective action that needs to be taken by the user. The plurality of haptic actuators 106 can actuate continuously, intermittently, or instantaneously. In one example, the plurality of haptic actuators 106 of the haptic arrangement may be controlled and arranged to provide different push (directed towards the user) patterns and/or push forces to provide the signal to the user. For example, a push pattern may correspond to a particular action and a push force may correspond to an urgency that the user should act or respond to. In some other embodiments, the plurality of haptic actuators 106 may alternatively or additionally provide compression caused by a change in tension of a haptic strap, or temperature variation (particularly heat) and/or vibration as the stimulation signal.

In one embodiment, the camera device 102, the processor 104, and the plurality of haptic actuators 106 are all carried by the user as the user travels in the environment. When the haptic guiding system 100 is in use, the information on the obstacles detected may be updated regularly and periodically, and hence the movement route and the haptic stimulation provided by the plurality of haptic actuators 106 may be changed dynamically as the user moves in the environment. There is no need for the GPS or Internet connection when performing the computation, as the processor 104 is configured to process the camera data (and/or LiDAR data) using the AI-based method of the processor 104 locally in the apparatus.

The camera device 102 and the processor 104 may be operably connected with each other via one or more communication links, which may be wired (e.g., buses) or wireless (Bluetooth®, ZigBee, etc.). The processor 104 and the plurality of haptic actuators 106 may be operably connected with each other via one or more communication links 310, which may be wired (e.g., buses) or wireless (Bluetooth®, ZigBee, etc.). The camera device 102 and the plurality of haptic actuators 106 may be operably connected with each other via one or more communication links 310, which may be wired (e.g., buses) or wireless (Bluetooth®, ZigBee, etc.). For the case of having wired connections to the plurality of haptic actuators 106, the one or more haptic straps 20 are provided with one or more connectors for electrically connecting the processor 104 and/or the camera device 102 with the plurality of haptic actuators 106.

The following description describes examples of how the processor 104 and the memory 340 may operate in the haptic guiding system 100. However, the processor 104 and the memory 340 can be used or integrated into other systems, or incorporate other systems and/or functions, without departing from the scope and spirit of the present disclosure.

The processor 104 may be implemented using one or more of: central processing unit (CPU), microcontroller (MCU), controllers, logic circuits, chip, digital signal processor (DSP), application-specific integrated circuit (ASIC), Field-Programmable Gate Array (FPGA), or any other digital or analog circuitry configured to interpret and/or to execute program instructions and/or to process information and/or data. The memory 340 may include one or more volatile memory units, such as random access memory (RAM), Dynamic random access memory (DRAM), static random access memory (SRAM), one or more non-volatile memory units, such as Read-only memory (ROM), programmable read-only memory (PROM), erasable programmable read-only memory (EPROM), electrically erasable programmable read-only memory (EEPROM), Ferroelectric RAM (FRAM), Magnetoresistive RAM (MRAM), FLASH, solid-state drive (SSD), NAND, and NVDIMM, or any of their combinations.

The processor 104 includes, among other things, an AI-based processing module 321 and a non-AI-based processing module 322. The memory 340 includes, among other things, one or more AI-based processing models 341 (which may not be machine-learning processing models), data 342, and executable instructions 343.

The AI-based processing module 321 is arranged to process data using the one or more AI-based processing models 341 to derive the movement route. In one embodiment, an AI-based processing module 321 may develop, using one or more AI-based processing models, a movement route for the user using data obtained from the sensing unit 101. The AI machine vision unit 321A is connected to the sensing unit 101 and is configured to detect one or more obstacles in the vicinity of the user. The obstacles detected from the real-time images may include both static and moving obstacles and/or barriers from ground to head level, and instinctively creating a 3D map of the static and moving obstacles and/or barriers of the environment. The AI machine vision unit 321A is executed on-board based on an edge detection algorithm, which is configured to determine a walkable area on each of the real-time images. In certain embodiments, the edge detection algorithm is a Canny algorithm, a Sobel operator, a Deriche edge detector, a Prewitt operator, or a differential edge detection. After performing edge detection, the real-time images are tagged by class labels using the semantic segmentation algorithm or other machine vision algorithms. This is important for extracting meaningful and critical information for object detection. The AI machine vision unit 321A further includes an object detection model for identifying one or more obstacles in the vicinity of the user. The obstacles may be static obstacles or moving obstacles. In certain embodiments, the object detection model is configured to detect objects positioned at ground to head levels of the user, and classify the objects as target destinations, static obstacles, or moving obstacles using a deep neural network. The object detection model may be configured to compare the detected obstacles in each real-time image for determining whether the object is moving. With the information on the target destination and the obstacles, a 3D map of the objects detected can be created.

Based on the walkable area and the 3D map of obstacles and/or barriers, the AI path planning unit 321B is configured to perform deep learning calculations or other machine learning algorithms for determining one or more possible movement routes in the environment that the user can move through the environment without being substantially affected by the obstacles and/or barriers and optionally avoids potential dangers. In one embodiment, an AI-based processing module 321 may determine using one or more AI-based processing models 341 a movement route for the user using data obtained from the camera device 102 or the LiDAR device 202, as well as other data obtained from the other sensors 208. The AI-based processing model 341 may generate a map of the safety risk level of the environment, then based on the map of safety risk level, determine one or more possible travel routes in the environment that can move through the environment while reducing or minimizing potential safety risks. The AI-based processing module 321 may use separate models to process the data obtained from the camera device 102, the LiDAR device 202, and the data obtained from the other sensors 208, then determine an output based on all processing results. The non AI-based processing module 322 is arranged to process data without using AI-based processing models 341 or methods. For example, the non AI-based processing module 322 may be used to perform various signal or data processing such as filtering, segmenting, thresholding, averaging, smoothing, padding, transforming, scaling, etc. The non AI-based processing module 322 may process an image of the environment and determine one or more properties in the environment (e.g., crowdedness). Additionally or alternatively, the non AI-based processing module 322 may process a sound signal to determine one or more of its properties or component (e.g., noise, speech, etc.).

The memory 340 is arranged to store one or more AI-based processing models 341 to be used by the processor 104 for processing data and performing the object detection and path planning. Each AI-based processing model 341 may correspond to a respective type of processing task. For example, the one or more AI-based processing models 341 may include one or more models for processing signals from the LiDAR device 202, another one or more models for processing signals from the other sensors 208 such as the sound sensor, etc. The memory 340, which is a computer-readable medium, stores data 342 and executable instructions 343 to be retrieved and/or used by the processor 104, that, if executed, cause the processor 104 to perform one or more functions of the AI machine vision unit 321A and the path planning unit 321B. In another word, the executable instructions 343 may enable at least one AI-based algorithm that automates operations to detect the one or more obstacles and develop the movement route, and at least one non-AI-based algorithm that performs data processing such as filtering, segmenting, thresholding, averaging, smoothing, padding, transforming, and scaling.

Optionally, the processor 104 may include one or more specifically designed processors and memory. The processor 104 may be arranged on a single device or multiple devices in a distributed manner (e.g., on a cloud computing network).

The processor 104 is further configured to control the operation of the haptic arrangement of the plurality of haptic actuators 106. In particular, the AI path planning unit 321B is configured to control the haptic arrangement of the plurality of haptic actuators 106 for executing a bionic haptic guiding mechanism for signifying a travel direction to the user based on the one or more possible travel routes and/or the movement route. In certain embodiment, the haptic unit 20 is capable of receiving movement commands from the AI path planning unit 321B. In one example, the plurality of haptic actuators 106 are distributed at locations proximate to an upper left section, an upper right section, a lower left section, and a lower right section of the user's body to form a haptic arrangement. Alternatively, the plurality of haptic actuators 106 may be distributed at locations proximate to the left section and right section of the user's body to form the haptic arrangement. The plurality of haptic actuators 106 are configured to receive movement commands from the AI path planning unit 321B indicative of respective movement actions, including but not limited to, forward movement, backward movement, turning left, turning right, sliding left, sliding right. Other walking strategies, such as bypassing, walking slowly, and stopping from moving, can also be indicated by actuating the plurality of haptic actuators 106.

In one example, the processor 104 is arranged to determine an actuation pattern of the multiple actuators that corresponds to the action that needs to be taken by the user. The plurality of haptic actuators 106 are arranged to be selectively actuated according to a predetermined actuation pattern corresponding to a respective action that needs to be taken by the user. Particularly, the action is selected from a moving action, a stop action, a move backward action, a move forward action, a turn left action, a turn right action, a slide left action, a slide right action, and an idle action.

Figure 11:
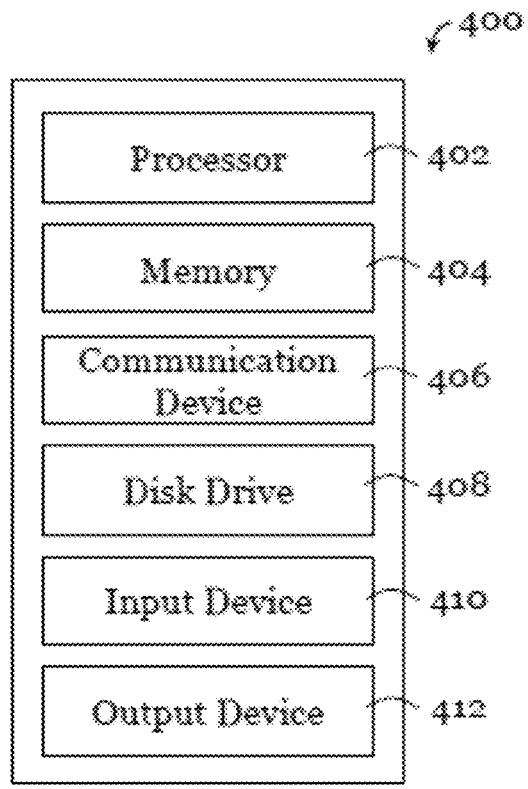
FIG. 11 is a block diagram of an information handling device in the haptic guiding system in accordance with certain embodiments of the present disclosure.

FIG. 11 shows an exemplary information handling system 400 that can be used as a server, computing system/device, or information processing system in one embodiment of the invention. In one embodiment, the processor 104 may form a part of the information handling system 400.

The information handling system 400 generally comprises suitable components necessary to receive, store, and execute appropriate computer instructions, commands, or codes. The main components of the information handling system 400 include a handling processor 402 and a storage memory 404. The handling processor 402 may be formed by one or more of: CPU, MCU, controllers, logic circuits, chip, DSP, application-specific integrated circuit (ASIC), Field-Programmable Gate Array (FPGA), or any other digital or analog circuitry configured to interpret and/or to execute program instructions and/or to process signals and/or information and/or data. The storage memory 404 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the storage memory 404. Optionally, the information handling system 400 further includes one or more input devices 410. Examples of such input devices 410 include one or more of: keyboard, mouse, stylus, image scanner (e.g., identifier (barcode, QR code, etc.) scanner), microphone, tactile/touch input device (e.g., touch-sensitive screen), image/video input device (e.g., the camera device 102, the LiDAR device 202), biometric data input device (e.g., fingerprint detector, facial detector, etc.), and other sensors 208, etc. Optionally, the information handling system 400 further includes one or more output devices 412. Examples of such output device 412 include one or more of: display (e.g., monitor, screen, projector, etc.), speaker, disk drive, headphone, earphone, printer, additive manufacturing machine (e.g., 3D printer), and the plurality of haptic actuators 106 etc. The display may include an LCD display, a LED/OLEO display, or any other suitable display that may or may not be touch sensitive. The information handling system 400 may further include one or more disk drives 408 which may encompass one or more of: solid state drive, hard disk drive, optical drive, flash drive, magnetic tape drive, etc. A suitable operating system may be installed in the information handling system 400, e.g., on the disk drive 408 or in the storage memory 404. The storage memory 404 and the disk drive 408 may be operated by the handling processor 402. Optionally, the information handling system 400 also includes a communication device 406 for establishing one or more communication links (not shown) with one or more other computing devices such as servers, personal computers, terminals, tablets, phones, watches, IoT devices, or other wireless or handheld computing devices. The communication device 406 may include one or more of: a modem, a Network Interface Card (NIC), an integrated network interface, an NFC transceiver, a ZigBee transceiver, a Wi-Fi transceiver, a Bluetooth® transceiver, a radio frequency transceiver, an optical port, an infrared port, a USB connection, or other wired or wireless communication interfaces. The transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the handling processor 402, the storage memory 404, and optionally the input device(s) 410, the output device(s) 412, the communication device 406 and the disk drives 408 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 400 shown in FIG. 11 is merely exemplary and that the information handling system 400 can in other embodiments have different configurations (e.g., additional components, fewer components, etc.).

Figure 12:
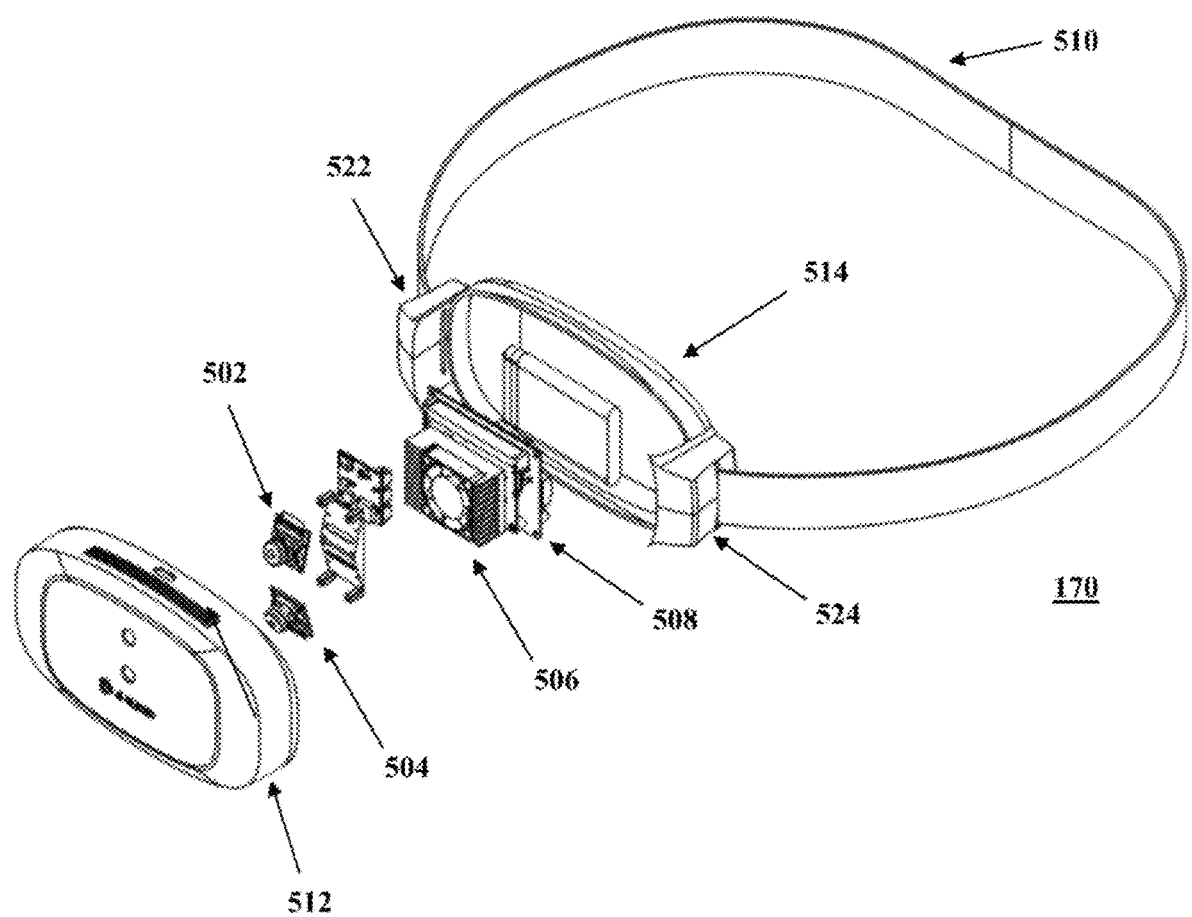
FIG. 12 is an exploded view of the seventh configuration of the haptic guiding system in accordance with certain embodiments of the present disclosure.

FIG. 12 is an exploded view of the seventh configuration 170 of the haptic guiding system 100. The illustration is intended to provide detailed descriptions of the internal structure of the apparatus, which may also be applied to other configurations as shown in FIGS. 1-10. The electronic device is provided in a device body having a front casing 512 and a back casing 514. Inside the device body, there are two cameras 502, 504 arranged to capture real-time images in front of the user. The first camera 502 is an upper camera for object detection, and the second camera 504 is a lower camera for path planning and semantic segmentation. The electronic device is mainly provided in the circuit board 508, with a heat dissipation device 506 attached. The electronic device is attached to a belt 510, and there are two actuators 522, 524 provided. The two actuators 522, 524 are configured to cause compression by a change in tension of the belt. Other actuators may be used instead to provide a vibration stimulation, a push actuation, a pull actuation, or a temperature stimulation without departing from the scope and spirit of the present disclosure.

Figure 13:
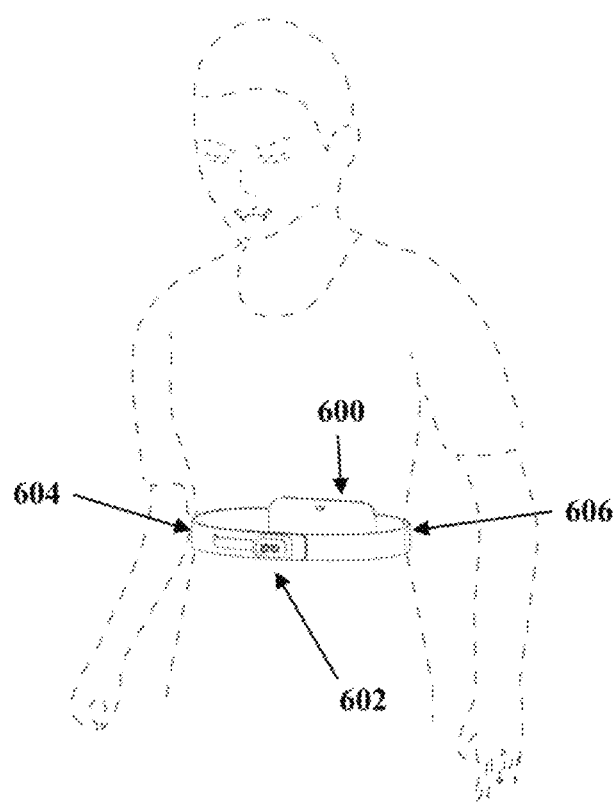
FIG. 13 is an alternative arrangement of the seventh configuration of the haptic guiding system in accordance with certain embodiments of the present disclosure.
Figure 14:
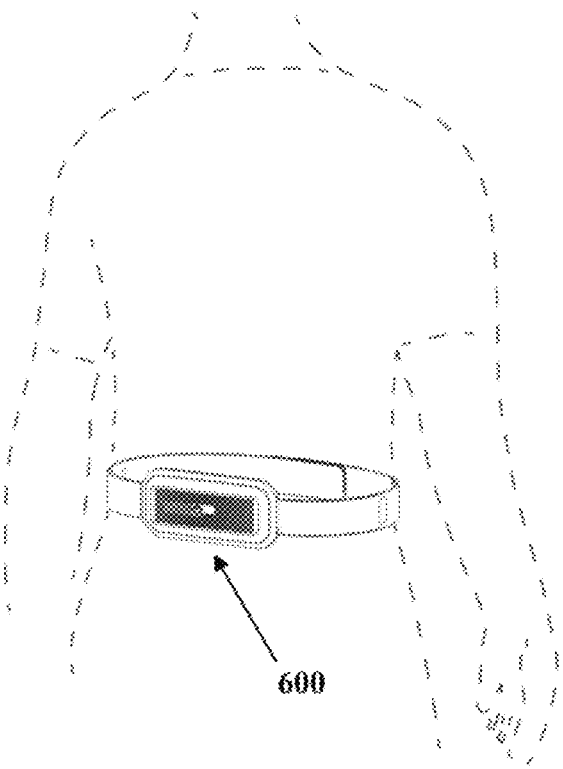
FIG. 14 is a rear perspective view of FIG. 13.

FIGS. 13-14 illustrate an alternative arrangement of the seventh configuration 170 of the haptic guiding system 100. The electronic device may be provided in a first device body 600 at the rear side. The two actuators 604, 606 are located at the underside of the belt, which are configured to provide a tactile stimulation to the torso or limbs of the user based on the movement commands. The sensing unit with one or more cameras is separated provided in a second device body 602 at the front side. Therefore, the device body may encompass more than two or more physical devices without departing from the scope and spirit of the present disclosure.

Figure 15:
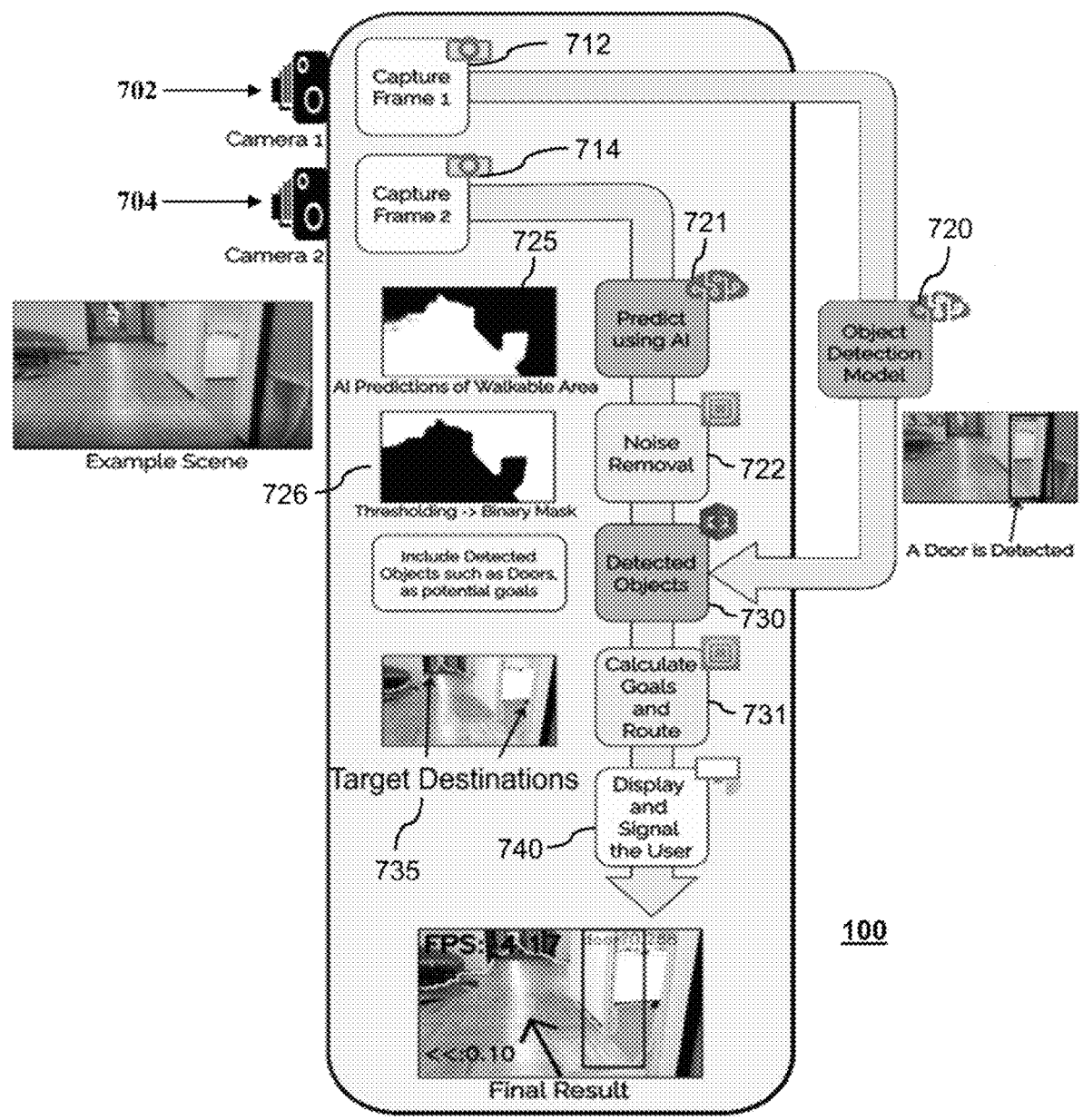
FIG. 15 is a block diagram of the haptic guiding system in accordance with certain embodiments of the present disclosure.

FIG. 15 is a block diagram of the haptic guiding system 100 with example scenes for showing the method of the present disclosure. The first camera 702 captures a first image 712, and the second camera 704 captures a second image 714. The first image 712 and the second image 714 are real-time images which may or may not be taken simultaneously, and may provide a slight difference in the angle of view of the environment as the physical positions of the first and second cameras 702, 704 are not the same. The first image 712 captured by the first camera 702 is used for object detection in the vicinity of the user using the object detection model 720. The detected objects 730 are classified for identifying obstacles and potential goals using a deep neural network. The potential goals are generally referred to as "target destinations" 735. The second image 714 captured by the second camera 704 is used for path planning and semantic segmentation, which can be used to determine a walkable area 725. In particular, an on-board AI-based edge detection algorithm 721 is executed to determine the walkable area 725 on each of the real-time images. By performing edge subtraction based on the walkable area 725 with noise removal 722 and appropriate thresholding, a binary mask 726 is generated. The binary mask 726 is a foreground mask of the same size as the original image, with each pixel marked as either a background pixel or a foreground pixel. With the detected object 730, the path planning unit 321B executes algorithms for calculating the goals and route 731 to the target destination 735. The result of displayed to the user, or the haptic unit 20 is actuated based on a movement route to signify the user 740.

Figure 16:
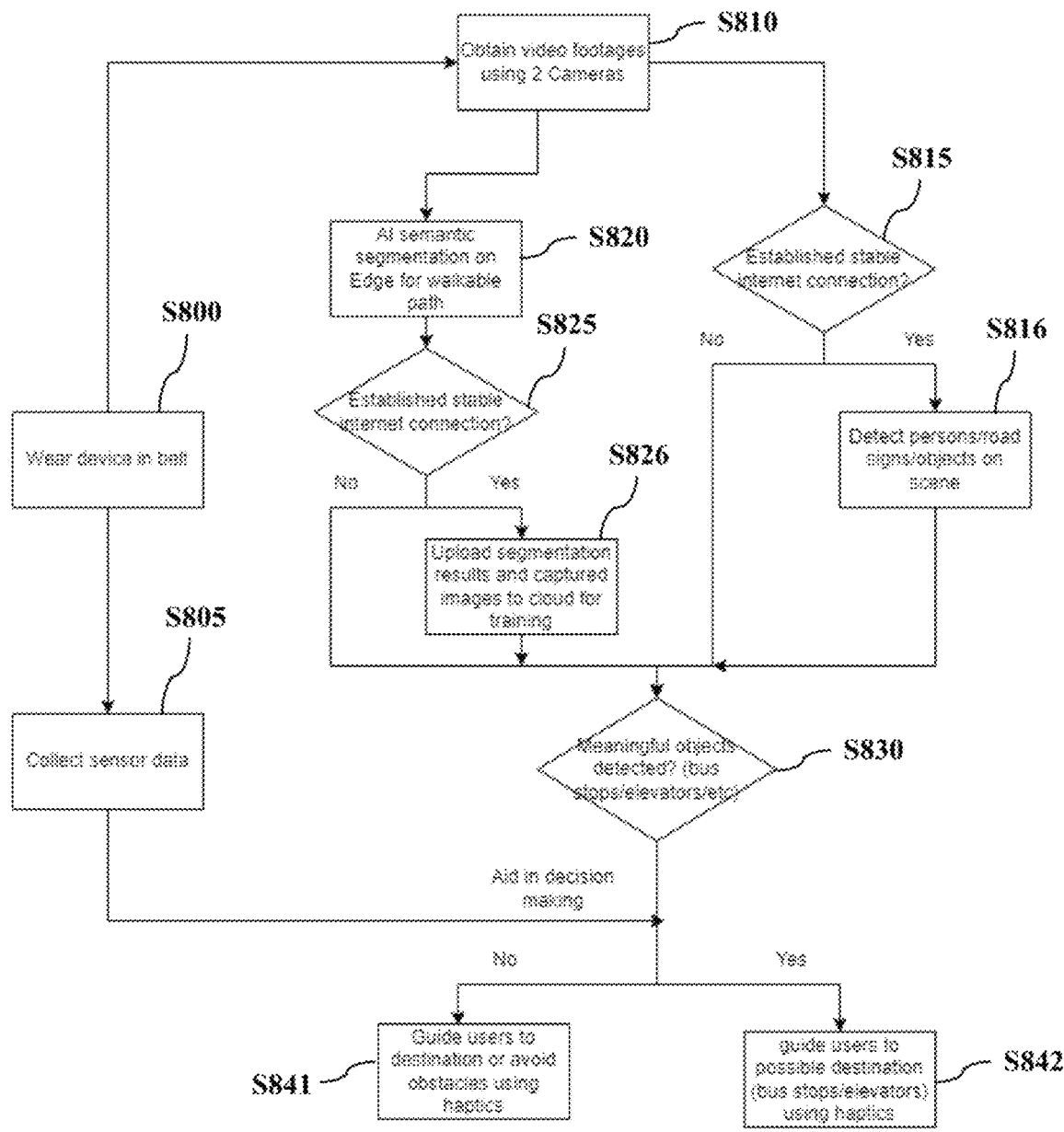
FIG. 16 is a flow chart showing the operation of the haptic guiding system in accordance with certain embodiments of the present disclosure.

FIG. 16 illustrates an exemplary flow chart showing the operation of the haptic guiding system 100. The user may be a visually impaired person, an elderly, or other people with disabilities. The haptic guiding system 100 may have different configurations as described in the foregoing description. In one exemplary implementation, the haptic guiding system 100 is provided in a device body in the form similar to a belt, which is arranged to be worn by or secured to the user at the waist. When the haptic guiding system 100 is secured 5800 and activated, the sensing unit 101 will continuously and regularly capture image-time images or video footages and other information of the environment in the vicinity of the user. In one example, the sensing unit 101 obtains video footages using a first camera and a second camera 5810, and collects sensor data 5805 from the one or more sensors 208. The two video footages are treated separately for the detection of objects and for path planning. The first video footage is used for object detection in the vicinity of the user using the object detection model. The second video footage is used for determining the walkable area and path planning. A stable internet connection is preferred for executing the object detection. If a stable internet connection is established 5815, the haptic guiding system 100 will detect objects on scene 5816 in the first video footage. On the other hand, the walkable area and the movement route are determined by semantic segmentation on the edges 5820. If a stable internet connection is established 5825, the segmentation results and the captured images are uploaded to the cloud for training 5826.

By combining the results from object detection and semantic segmentation, it is possible to further detect meaningful objects 5830. With the aid of the sensor data from the one or more sensors, the haptic guiding system 100 can guide the user to the destination or to avoid obstacles using the haptic unit 5841; or if meaningful objects are detected, the haptic guiding system 100 can guide the user to the possible destination directly using the haptic unit 5842.

The present disclosure provides a haptic guiding system 100 for assisting the mobility of a user in need of a guiding assistant, such as a visually impaired person, an elderly, or other people with disabilities. The haptic guiding system 100 helps the user to better navigate an environment, including both indoor and outdoor environments. The haptic guiding system 100 can be used alone without other assistive means (e.g., white cane or guide dog) or the haptic guiding system 100 can be used with other assistive means (e.g., white cane or guide dog). The use of the camera data and the LiDAR data enables a reliable movement route or path to be devised. Also, the haptic guiding system 100 provides substantially real-time, intuitive feedback to the user to guide the user on how he/she should move (or not move) to travel safely in the environment. In some implementations, such as the one described above, the actuation of the multiple actuators is arranged to provide a "push" (or multiple "pushes") to signal how the user should move, which can be intuitively and readily interpreted by the user. The real-time, intuitive feedback allows the user to readily respond and take necessary action to avoid potential obstacles or dangers.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the present disclosure are either wholly implemented by a computing system or partly implemented by computing systems then any appropriate computing system architecture may be utilized. This will include stand-alone computers, network computers, and dedicated or non-dedicated hardware devices. Where the terms "computing system" and "computing device" are used, these terms are intended to include (but are not limited to) any appropriate arrangement of computer or information processing hardware capable of implementing the function described.

This illustrates the fundamental structure of the haptic guiding system in accordance with the present disclosure. It will be apparent that variants of the above-disclosed and other features and functions, or alternatives thereof, may be combined into many other different kinds of assistive devices. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A wearable haptic apparatus for assisting the mobility of a user, comprising:
an electronic device provided in a device body arranged to be worn by or secured to the user torso, the electronic device comprising a haptic unit, a sensing unit, an artificial intelligence (AI) machine vision unit, a processing unit, and a path planning unit, wherein:
the AI machine vision unit is connected to the sensing unit and is configured to detect one or more obstacles in a vicinity of the user; and
the path planning unit is capable of developing a movement route for the user to avoid the one or more obstacles;
the haptic unit is capable of receiving movement commands from the path planning unit, the haptic unit comprising a haptic arrangement having a plurality of haptic actuators adapted to provide a tactile stimulation to torso or limbs of the user,
wherein the plurality of haptic actuators actuates based on the movement commands, and
wherein the tactile stimulation is applied to one or more target sites of the user's body torso, and the plurality of haptic actuators actuates to signify a travel direction in which there is no obstacle, wherein at least one first haptic actuator in the plurality of haptic actuators is operatively connected to the path planning unit and is disposed on a first side of the user's torso of anterior or posterior, and wherein at least one second haptic actuator in the plurality of haptic actuators is operatively connected to the path planning unit and is disposed on a second side of the user's torso, the second side of the user's torso being opposite to the first side thereof; and
the processing unit is capable of receiving a navigational command from a command generation module in the path planning unit, wherein the navigational command is either a directional guidance command for signaling a movement direction to the user, or a mobility command for signaling a movement speed to the user, and wherein the processing unit is configured to:
in response to the navigational command being the directional guidance command, activate the at least one first haptic actuator to generate a corresponding directional haptic signal from a predefined set of directional haptic signals; and
in response to the navigational command being the mobility command, activate the at least one second haptic actuator to generate a corresponding mobility haptic signal from a predefined set of mobility haptic signals.

2. The apparatus of claim 1, wherein the sensing unit continuously and regularly captures real-time images of an environment, and acts as an environmental detection device configured to generate real-time environmental data, wherein the path planning unit is operatively connected to the environmental detection device and is configured to receive the real-time environmental data and generate the navigational command based on the received real-time environmental data, and wherein the sensing unit comprises one or more sensing devices selected from a group consisting of a camera device, a light detection and ranging (LiDAR) device, and a radio detection and ranging (RADAR).

3. The apparatus of claim 2, wherein:
the environmental detection device is equipped with the AI machine vision unit with AI vision function supporting calculation configured to determine a walkable area on each of the real-time images and identify the one or more obstacles using an AI object detection model; and
the path planning unit is equipped with AI path calculation capable of developing the movement route with a set of safe routes by avoiding the one or more obstacles and transmit to the haptic unit the movement commands based on the movement route; and
if the walkable area or the set of safe routes is undeterminable, the command generation module generates slow down and stop commands.

4. The apparatus of claim 3, wherein the AI machine vision unit determines the walkable area using a specified trained AI model that includes a mixture of algorithms including an edge detection algorithm and a semantic segmentation algorithm, wherein the edge detection algorithm is selected from a Canny algorithm, a Sobel operator, a Deriche edge detector, a Prewitt operator, and a differential edge detection, and wherein the AI model is capable of identifying key features of an object inside each real-time image and is configured to determine the walkable area and the set of safe routes within the determined walkable area.

5. The apparatus of claim 1, wherein the tactile stimulation is at least one vibration stimulation morphology selected from a push actuation, a pull actuation, a temperature stimulation, and a compression caused by a change in tension of a haptic strap, and wherein the tactile stimulation is organized in a specific arrangement of user torso anterior side and/or posterior side to achieve directional guiding to the user.

6. The apparatus of claim 1, wherein:
the plurality of haptic actuators is provided on one or more haptic straps, a haptic belt, a haptic band located on the user torso anterior side and/or posterior side; and
the path planning unit is configured to control the haptic arrangement of the plurality of haptic actuators on the user torso for executing haptic actuation with movement information as a guiding mechanism for signifying the travel direction to the user; and
the path planning unit is connected to an environmental detection device, and is configured to receive real-time environmental data and to generate the navigation command based on the received data from the environmental data device.

7. The apparatus of claim 6, wherein each of the plurality of haptic actuators comprises a motorized finger, an eccentric rotating mass, a linear resonant actuator, or any other actuators that exerts a force to the skin of the user, and wherein the plurality of haptic actuators actuates continuously, intermittently, or instantaneously, with a vibrations frequency within a range of 1-500 Hz, and a variation in intensity of vibration.

8. The apparatus of claim 1, wherein the electronic device further comprises:
a processor; and
a computer-readable medium for storing executable instructions that, if executed, cause the processor to perform one or more functions of the machine vision unit and the path planning unit, wherein the executable instructions enable:
at least one AI-based algorithm or decision model that automates operations to detect the one or more obstacles and non-obstacles and develop the movement route; and at least one non-AI-based algorithm that performs data processing such as filtering, segmenting, thresholding, averaging, smoothing, padding, transforming, and scaling.

9. The apparatus of claim 8, wherein the at least one AI-based algorithm is configured to:
detect or recognize static and moving obstacles from ground to head levels;
create a 3D map of the static and moving obstacles; and
perform deep learning calculations for determining one or more possible movement routes in the vicinity of the user that the user can move through without being affected by the obstacles, wherein the deep learning calculations include detecting a step or curb-like structure along the predetermined movement route and intersect with the user's path so as to enable the command generation module to generate ascending or descending commands to guide the user either to elevate step or lower step.

10. The apparatus of claim 6, wherein the apparatus is operable under a path following mode for signifying the travel direction to the user, wherein the path following mode is implemented by means of anterior side's left and right haptic signals, and posterior side's left and right haptic signals, wherein each haptic signal is characterized by vibrations at a predetermined first frequency and intensity, and wherein an operational combination of the left and right haptic signals is configured to provide one of following directional guidance in response to a path following command under the path following mode:
 i. co-activation of the posterior left and right haptic signals on the posterior torso side at a predetermined interval to suggest a forward motion in response to the path following command being a forward command;
 ii. exclusive activation of the left haptic signal to indicate a left turn in response to the path following command being a left turn command;
 iii. exclusive activation of the right haptic signal to indicate a right turn in response to the path following command being a right turn command; and
 iv. co-activation of the left and right haptic signals at a predetermined interval to indicate an arrival action to target location in response to the path following command being a stop command.

11. The apparatus of claim 6, wherein the apparatus is operable under an obstacles avoidance mode for signifying obstacles direction from the user, wherein the obstacles avoidance mode is implemented by means of an anterior torso side receiving left haptic signal and/or right haptic signal, and a posterior torso side receiving left haptic signal and/or right haptic signal, wherein each haptic signal is characterized by vibrations at a predetermined second frequency and intensity, and wherein an operational combination of the left and right haptic signals is configured to provide one of following obstacles direction guidance in response to an obstacles direction command under the obstacles detection mode:
 i. co-activation of the left and right haptic signals on the anterior torso side at a predetermined interval to suggest forward obstacles in response to the obstacles direction command being forward obstacles command;
 ii. exclusive activation of the left haptic signal on the anterior torso side to indicate a left obstacle in response to the obstacles direction command being a left obstacles command;
 iii. exclusive activation of the right haptic signal on the anterior torso side to indicate a right obstacle in response to the obstacles direction command being a right obstacles command; and
 iv. co-activation of the left and right haptic signals on the torso side to indicate a stop action to remind an immediate stop in response to the obstacles direction command being a stop command.

12. The apparatus of claim 1, wherein for the directional guidance command or the mobility command, the processing unit is further configured to:
cooperate the directional guidance command and mobility command; or
operate the directional guidance command alone; or
operate the mobility command alone, wherein commands are delivered to the haptic unit under priority of circumstances.

13. A method for assisting a user in navigation by using the wearable haptic apparatus of claim 1, comprising:
receiving a first image and a second image captured by one or more cameras;
determining a walkable area using an edge detection algorithm and an AI semantic segmentation algorithm on the second image;
identifying one or more obstacles in a vicinity of the user using an object detection model on the first image;
responsive to the walkable area, developing a movement route for the user by avoiding the one or more obstacles; and
transmitting movement commands to a haptic unit for signifying to the user a travel direction.

14. The method of claim 13, wherein the step of identifying the one or more obstacles further comprises:
detecting objects positioned at ground to head levels of the user;
classifying the objects as target destination, static obstacles, or moving obstacles; and
creating a 3D map of the objects detected.

15. The method of claim 14, wherein the step of developing the movement route further comprises constructing boundary lines within the walkable area leading to the target destination; and dynamically determining a distance between the user and each of the boundary lines for performing realignment to avoid a collision.

16. The method of claim 14, wherein the static obstacles are avoided by adjusting the movement route; and the moving obstacles are avoided by instructing the user to wait for the moving obstacles to move sufficiently away from the user.

17. The method of claim 13, wherein the step of developing the movement route for the user further comprises generating a map of safety risk levels of the environment; and performing deep learning calculations to determine one or more possible movement routes in the vicinity of the user that the user can move through without being affected by the static and moving obstacles.

18. The method of claim 13, wherein the edge detection algorithm is a Canny algorithm, a Sobel operator, a Deriche edge detector, a Prewitt operator, or a differential edge detection.

19. The method of claim 13, wherein the object detection model is trained to detect and classify objects in the first image using a deep neural network.

20. The method of claim 13, wherein the first image is captured by a first camera, and the second image is captured by a second camera.

21. A haptic guiding system for guiding a user in navigation, comprising:

an electronic device provided in a device body for capturing real-time images of an environment and developing a movement route for the user to avoid one or more obstacles, wherein the device body is arranged to be worn by or secured to the user; and a plurality of haptic actuators electrically connected to the electronic device for receiving movement commands, wherein the plurality of haptic actuators is adapted to provide a tactile stimulation to the user based on the movement route, wherein the electronic device comprises a processor configured to:
  determine a walkable area on each of the real-time images using an edge detection algorithm and an AI semantic segmentation algorithm; and
  identify the one or more obstacles in a vicinity of the user using an object detection model based on the walkable area on each of the real-time images; and
wherein the processor is capable of receiving a navigational command, wherein the navigational command is either a directional guidance command for signaling a movement direction to the user, or a mobility command for signaling a movement speed to the user, and wherein the processor is further configured to:
  in response to the navigational command being the directional guidance command, activate at least one first haptic actuator in the plurality of haptic actuators to generate a corresponding directional haptic signal from a predefined set of directional haptic signals; and
  in response to the navigational command being the mobility command, activate at least one second haptic actuator in the plurality of haptic actuators to generate a corresponding mobility haptic signal from a predefined set of mobility haptic signals.

22. The haptic guiding system of claim 21, wherein the object detection model is configured to:
  detect objects positioned at ground to head levels of the user;
  classify the objects as target destination, static obstacles, or moving obstacles; and
  create a 3D map of the objects detected.

23. The haptic guiding system of claim 22, wherein the processor is further configured to construct boundary lines within the walkable area leading to the target destination; and dynamically determine a distance between the user and each of the boundary lines for performing realignment to avoid a collision.

24. The haptic guiding system of claim 22, wherein the static obstacles are avoided by adjusting the movement route; and the moving obstacles are avoided by instructing the user to wait for the moving obstacles to move sufficiently away from the user.

25. The haptic guiding system of claim 21, wherein the processor is configured to perform deep learning calculations for determining one or more possible movement routes in the vicinity of the user that the user can move through without being affected by the obstacles.

26. The haptic guiding system of claim 21, wherein the electronic device further comprises a memory comprising one or more AI-based processing models, wherein the processor is configured to process training data stored in the one or more AI-based processing models to derive the one or more possible movement routes.

27. The haptic guiding system of claim 21, wherein the plurality of haptic actuators are wirelessly connected to the electronic device, and are positioned on an underside of one or more haptic straps, a haptic belt, a waist band, or two or more wrist bands.

28. The haptic guiding system of claim 21, wherein the electronic device further comprises one or more sensing devices selected from a group consisting of a camera device, a light detection and ranging (LiDAR) device, and a radio detection and ranging (RADAR), and wherein the one or more sensing devices collect geographic information system (GIS) data from the environment and surroundings.

* * * * *